(12) United States Patent
Berggren et al.

(10) Patent No.: US 8,817,427 B2
(45) Date of Patent: Aug. 26, 2014

(54) CURRENT LIMITATION SYSTEM FOR LIMITING THE EFFECTS OF A FAULT IN A DC GRID AND A METHOD OF OPERATING A CURRENT LIMITATION SYSTEM

(75) Inventors: Bertil Berggren, Västerås (SE); Jurgen Häfner, Ludvika (SE); Lars-Erik Juhlin, Ludvika (SE); Kerstin Linden, Ludvika (SE); Lidong Zhang, Västerås (SE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/983,996

(22) PCT Filed: Mar. 11, 2011

(86) PCT No.: PCT/EP2011/053738
§ 371 (c)(1),
(2), (4) Date: Sep. 10, 2013

(87) PCT Pub. No.: WO2012/123014
PCT Pub. Date: Sep. 20, 2012

(65) Prior Publication Data
US 2014/0022680 A1    Jan. 23, 2014

(51) Int. Cl.
*H02H 3/00* (2006.01)
*H02H 3/08* (2006.01)
*H02H 3/02* (2006.01)
*H02H 7/26* (2006.01)
*H02H 3/20* (2006.01)

(52) U.S. Cl.
CPC . *H02H 3/08* (2013.01); *H02H 3/02* (2013.01); *H02H 7/268* (2013.01); *H02H 3/20* (2013.01)
USPC ............................................. 361/8; 361/62

(58) Field of Classification Search
USPC .............................. 361/8, 62, 93.9
See application file for complete search history.

(56) References Cited

U.S. PATENT DOCUMENTS

| 5,999,388 A | 12/1999 | Asplund | |
| 8,687,389 B2 * | 4/2014 | Dommaschk et al. | 363/53 |
| 2010/0254046 A1 * | 10/2010 | Liu et al. | 361/8 |

FOREIGN PATENT DOCUMENTS

| EP | 0 867 998 A1 | 9/1998 |
| WO | WO 2011/095212 A2 | 8/2011 |

* cited by examiner

*Primary Examiner* — Danny Nguyen
(74) *Attorney, Agent, or Firm* — Birch, Stewart, Kolasch & Birch, LLP

(57) ABSTRACT

A current-limitation system for limiting a current through an DC connection in case of a fault occurring in a DC grid of which the DC connection forms a part is provided, as well as a method of operating a current-limitation system for limiting a current through an DC connection in case of a fault occurring in a DC grid of which the DC connection forms a part.

20 Claims, 11 Drawing Sheets

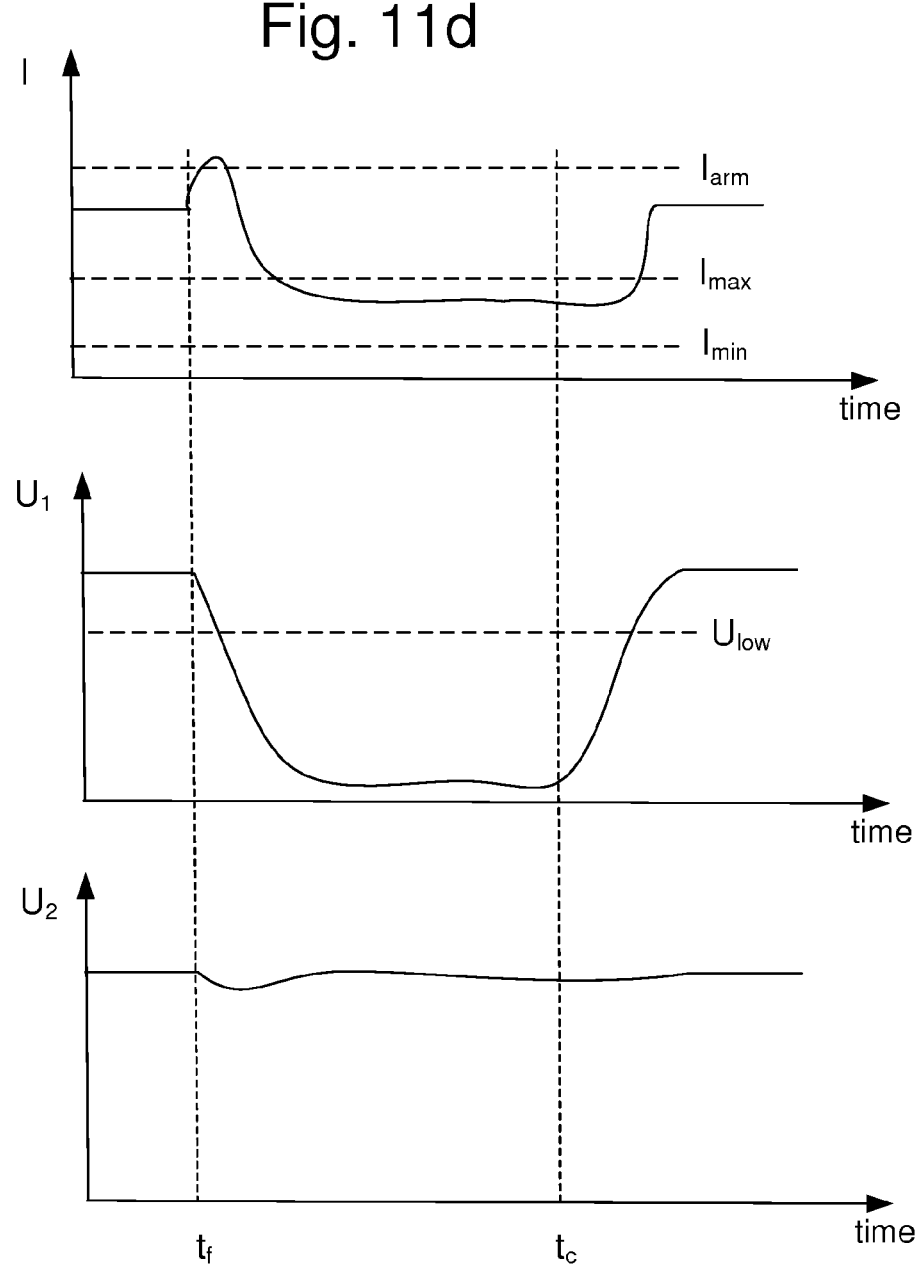

CURRENT LIMITATION SYSTEM FOR LIMITING THE EFFECTS OF A FAULT IN A DC GRID AND A METHOD OF OPERATING A CURRENT LIMITATION SYSTEM

TECHNICAL FIELD

The present invention relates to the field of power transmission, and in particular to power transmission using High Voltage Direct Current (HVDC) technology.

BACKGROUND

Transmission of power over long distances can advantageously be performed using HVDC transmission lines. In an AC transmission system, the transmission losses are dependent on both active and reactive power transfers. For long transmission lines, the losses due to the reactive power transfer will be significant. In an HVDC transmission system, on the other hand, only active power is transferred. The losses in an HVDC transmission line will thus be lower than the losses in an AC transmission line of the same length. For long distance transmission, the higher investment of necessary conversion equipment in an HVDC system is often justified.

A drawback of DC transmission as compared to AC transmission is that the interruption of a fault current is more difficult. A fault current in an AC system inherently exhibits frequent zero crossings, which facilitate for fast current interruption. In a DC system, no inherent zero crossings occur. In order to break a DC current, a zero crossing of the DC current generally has to be forced upon the system.

Moreover, in an AC system, the fault current will be limited by the reactance of the transmission lines. In a DC system on the other hand, the inductance of a transmission line will only matter in the transient stage. When the transient (quite quickly) diminishes, only the resistance of the lines will limit the level of the fault current on the DC side. Thus, the fault current can grow very rapidly in a DC grid. A fast breaking of a fault current is therefore desired.

Furthermore, power from the AC side will be fed into a fault that occurs on the DC side. Typically, this implies that the fault currents are high on the DC side, whereas the DC voltages in case of a fault will be low throughout the DC grid, making organized power transfer impossible during the faulted time period. This is particularly pronounced when at least some of the converters are based on Voltage Source Converter (VSC) technology, since the switches of a VSC converter will typically have to be blocked when the current rises above a certain level, leaving the VSC converter basically operating as a diode bridge. This level is here referred to as the converter blocking-level. The more converters that are connected to the DC grid, the higher the DC current in the fault. The situation of having depressed DC voltages, with the consequential power transfer inability, may, if prolonged, have serious impact on the AC system stability. AC system instability would result in black-outs, which are very costly for society. In order to prevent AC system instability, the AC systems could be designed with substantial reserve transfer capability. However, such over-dimensioning of the AC systems is very costly and generally not desired. Hence, a fast breaking of a DC fault current, before the DC voltages have collapsed, is desired.

Thus, in order to limit the effects of a line fault, an HVDC breaker should react very fast, typically in the transient stage while the fault current still is increasing and before the DC voltages have collapsed too much. Efforts have been put into the development of fast and reliable HVDC breakers, and the HVDC breakers that currently provide the fastest interruption of current are based on semi-conducting technology. A semiconductor HVDC breaker is for example disclosed in EP0867998. However, semi-conductor HVDC breakers experience a power loss which is higher than in a mechanical breaker. Furthermore, semi-conductor HVDC breakers designed to break large currents are considerably more expensive than mechanical breakers. However, existing mechanical breakers cannot provide sufficient breaking speed. Thus, there is a need for cost- and energy effective fault current handling in a DC grid.

SUMMARY

A problem to which the present invention relates is how to efficiently limit the negative consequences of a fault occurring in a DC grid.

This problem is addressed by a current-limitation system for limiting a current through a DC connection in case of a fault occurring in a DC grid of which the DC connection forms a part. The current-limitation system comprises a current limiter for series-connection into the DC connection, and a control system for controlling the current-limiting strength of the current limiter. The control system comprises the control system comprises a current measuring device arranged to measure the current through the current limiter, and the control system is operable to detect a fault. The control system is further operable to, in response to detecting the fault; to adjust the current-limiting strength of the current limiter in a manner so that if the current through the breaker exceeds a first current threshold ($I_{max}$), the current-limiting strength is increased; and if the current through the breaker falls below a second current threshold ($I_{min}$), the current-limiting strength is decreased.

The problem is further addressed by a method of operating a current-limitation system for limiting a current through a DC connection in case of a fault occurring in a DC grid of which the DC connection forms a part. The method comprises detecting, in the current-limitation system, a fault. The method further comprises, in response to detecting the fault, adjusting the current-limiting strength of the current limiter in a manner so that if the current through the breaker exceeds a first current threshold ($I_{max}$), the current-limiting strength is increased; and if the current through the breaker falls below a second current threshold ($I_{min}$), the current-limiting strength is decreased.

In one embodiment, the first current threshold lies below the rated current of the transmission. This embodiment can for example be advantageous when the current limiter is connected at the DC side of an AC/DC converter to limit the current flowing from the AC/DC converter into a fault in the DC grid. By limiting the fault current from the AC/DC converter to a level below the rated current, the active power transfer to the DC grid from the AC/DC converter will be kept below the rated power of the AC/DC converter, thus allowing for the provision of reactive power from the AC/DC converter to an AC power system connected at the AC side of the AC/DC converter.

In another embodiment, the second current threshold lies above the rated current of the transmission (while the first current threshold lies below the fault current that occur had no current limiter been present). This embodiment can for example be advantageous when a quick recharging of the transmission lines is desired upon clearing of the fault. This can for example be the case if the current limitation system is used to divide a DC grid into at least two zones, in order to prevent the effects of a fault in a zone to spread outside that zone.

Regulation of a fault current to lie within a regulation range falling below or above the rated current can be achieved in dependence on voltage measurement at the side of the current limiter which faces the fault, and in dependence on measurements of the current through the current limiter.

Regulation of a fault current to lie within a regulation range falling above the rated current can be made in dependence on the current through the current limiter. The method of operation of the current limiter could then be simplified in that no voltage measurements are required.

In one embodiment the current limiter comprises a series connection of independently controllable breaker sections, wherein a breaker section comprises a parallel connection of a non-linear resistor and a semi-conductor switch of turn-off type. The control system is in this embodiment operable to send blocking and/or firing signals to the semiconductor switches of the breaker sections in order to adjust the current-limiting strength of the current limiter. By this embodiment is achieved that an efficient adjustment of the current-limiting strength of the current limiter is achieved. In one implementation of this embodiment, the control system is further operable to estimate the present energy absorbing capacity of the non-linear resistors; and select which breaker section(s) should be opened or closed, if any, in dependence of the different present energy absorbing capacities of the non-linear resistors. An efficient utilization of the energy-absorbing capacity of the current limiter is thus achieved.

In this embodiment, the current limiter could comprise a transfer switch which is closed during normal operation, but which is opened to commutate the current to the series-connection of breaker sections in case of a fault. By use of a transfer switch wherein the power loss is lower than in the series-connection of breaker sections, the power loss in the current limiter can be reduced during normal operation.

The current-limiter could be a current-limiting breaker capable of breaking the current at at least the rated voltage. The current-limitation system could further comprise a self-protective control system operable to generate a damage indication if the current limiter is at risk for thermal damage, and to generate, in response to such damage indication, a tripping signal instructing the current limiter, or a breaker protecting the current limiter, to break the current. Such damage indication could for example be based on estimates of the present energy-absorbing capability of the non-linear resistors, when the current limiter comprises a series connection of breaker sections.

The problem is further addressed by an AC/DC converter station comprising a AC/DC converter, a connection to a DC grid and a current-limitation system, wherein the current limiter of the current-limitation system is series-connected in the connection to the DC grid. The problem is also addressed by a DC grid (100) comprising at least two AC/DC converters interconnected via a DC connection, as well as at least one current-limitation system according to any one of the above claims, where the current limiter of the current-limitation system is series-connected in a DC connection. In one embodiment of the DC grid, the DC grid is divided into at least two zones by means of at least one current limiting system in a manner so that a current limiter is connected in each of the DC line(s) by which two zones are interconnected.

Further aspects of the invention are set out in the following detailed description and in the accompanying claims.

BRIEF DESCRIPTION OF THE DRAWINGS

FIGS. 11*a*-*d* illustrate the sequence of events in terms of current and voltage as a function of time for different embodiments of the method of determining the required current limiting strength of a current limiter.

DETAILED DESCRIPTION

Figure 1:
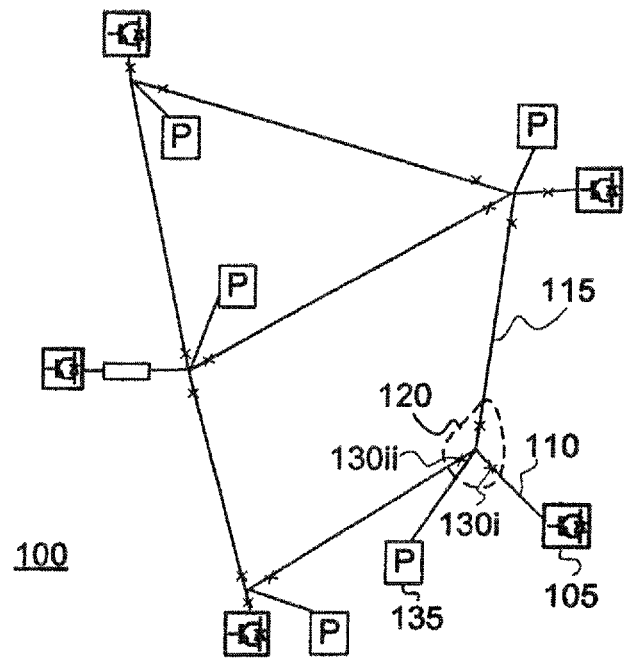
FIG. 1 is a schematic drawing of an example of a DC grid.

FIG. 1 is a schematic illustration of an example of a DC grid 100 for high voltage DC (HVDC) transmission. The DC grid 100 comprises five different high voltage AC/DC converters 105, here referred to as HVDC converters 105, which are interconnected via DC switchyards 120 and DC lines 115 for high voltage transmission, here referred to as HVDC lines 115. A HVDC converter 105 is connected to an AC power system (not shown) at one end, and to a DC switchyard 120 via a connection 110 at the other end. In FIG. 1, the DC switchyards 120 have been shown to be of a single bus bar configuration for illustration purposes, but other configurations may alternatively be used, such as a double busbar, a two breaker switchyard, a one and a half breaker switchyard, etc. The HVDC lines 115 may be cable or overhead lines, or combinations thereof. Connections 110 and HVDC lines 115 can be bipolar or mono-polar.

A converter 105 could for example be a Voltage Source Converter (VSC), or a Current Source Converter (CSC). In recent years, point-to-point HVDC transmission systems based Voltage Source Converter (VSC) have been developed. VSC technology is particularly advantageous for building DC grids, inter alia since the VSC technology allow for power reversal by simply performing a DC current reversal.

A connection 110 in a high voltage DC grid is typically connected to a DC switchyard 120 over a high voltage DC breaker 130i, hereinafter referred to as an HVDC breaker 130i. A connection between the HVDC converter 105 and an AC switchyard (at the other side of the HVDC converter 105) is typically made over an AC breaker (not shown). An HVDC breaker 130ii is typically provided at the connection of a HVDC line 115 to a DC switchyard 120, so that each HVDC line 115 is equipped with two HVDC breakers 130ii, which are located at the respective ends of the HVDC line 115. In the following, when referring to HVDC breakers generally, the term HVDC breaker 130 will be used. The various HVDC breakers 130i and 130ii could, if desired, be implemented in the same manner, and the difference in reference numeral only indicates the difference in location in the DC grid topology.

A protection system 135 is typically provided at each switchyard 120, the protection system 135 being designed to detect a fault situation and to send, if required, a trip signal to the appropriate HVDC breaker(s) 130. Thus, in case of a fault on a HVDC line 115, the HVDC breakers 130ii at each end of the HVDC line 115 will receive a trip signal from such protection system 135. A line fault could e.g. be a pole-to-ground fault or a pole-to-pole fault, or a combination thereof. Similarly, if a fault is detected on the connection 110, or in the HVDC converter 105, the HVDC breaker 130i will receive a trip signal. In these latter scenarios, an AC breaker on the AC side will also receive a trip signal. However, in the following, for ease of description, reference will be made only to the tripping of HVDC breakers 130. A protection system 135 is typically designed to only remove the faulty piece of equipment in case of a fault, leaving the rest of the system intact after fault clearing. Protection systems are well known in the art, and typically comprise measurement equipment and software algorithms for the determination of existence of a fault. Such algorithms could for example be based on measurements of voltage and current, their magnitudes and/or their derivatives in various combinations, and/or on so called differential protection, which is based on comparisons of the current at each side of an object, such as an HVDC line 115 or a HVDC converter 105.

The DC grid 100 of FIG. 1 is an example only, and a DC grid 100 could here comprise any number N of HVDC converters 105, where N≥2, interconnected in any fashion. A DC grid 100 typically comprises further equipment which has not been shown in FIG. 1, such as measurement devices, DC reactors, filters, etc. When only two HVDC converters 105 are interconnected in a point-to-point transmission line, no DC switchyard 120 will have to be provided.

The clearing of a fault will be performed by tripping of the appropriate HVDC breakers 130 surrounding the faulty object. Such tripping will typically be initiated by the protection system 135 which monitors the faulty object. Objects wherein a fault could occur could for example be an HVDC line 115, an HVDC converter 105, a connection 110 or a DC switchyard 120.

As mentioned above, the speed at which the HVDC breakers 130 operate will determine how high a fault current will rise in the DC grid 100 before it is broken. It is generally desired to keep the breaking speed as high as possible. Today, HVDC breakers based on semi-conductor technology can be made sufficiently fast, with breaking speeds of as low as in the μs scale. However, since semi-conducting HVDC breakers based on power electronic technology are typically quite costly compared to less speedy alternatives, a way of efficiently limiting the negative consequences of a fault occurring in a DC grid 100, while using more slowly operating HVDC breakers, would be desired.

According to the invention, a current limiter for limiting a current through a connection 110 or a HVDC line 115 in a DC grid is provided. A control system for controlling the current-limiting strength of the current-limiter is also provided, the current limiter and the control system forming a current-limitation system. The current limiter has an interface for series-connection into a connection 110 or an HVDC line 115. In the following, when commonly referring to connections 110 and HVDC lines 115, the term HVDC connection will be used, the term DC connection including both DC lines 115 and connections 110 connecting an AC/DC converter 105 to a DC grid 100.

By use of a fast current limiter, other HVDC breakers 130 within the DC grid 100 can be of a design which provides slower operation. By quickly limiting a fault current to a level lower than what the fault current would have been if no current limiter was present, HVDC breakers 130 of comparatively low breaking speed can be used. Furthermore, the breaking capacity of at least some HVDC breakers 130 in the DC grid 100 can be reduced, since the currents to be broken, even if a fault situation occurs, will be lower. Depending on at which position(s) in the DC 100 grid that the fast current limiter(s) are provided, and at what positions HVDC breakers 130 are provided, the positive effects of the current limitation provided by the current limiter(s) will benefit different HVDC breakers 130 at different positions, in the DC grid.

The breaking speed requirements on a HVDC breaker 130 in a DC grid 100 depends for example on for how long the current limiter 205 can operate to hold the current at an acceptable level; on the stability of an AC system; to which current level the current limiters 205 control the current; and on the current-breaking capability on the HVDC breaker 130. Examples of suitable designs of HVDC breakers of lower breaking speed are e.g. mechanical HVDC breaker designs such as those described in "Cigré technical brochure 114, Circuit-breakers for meshed multiterminal HVDC systems", the breaking speed of which is in the range of an AC-breaker, e.g. 30-60 ms.

Fast current limiters could also be used to facilitate for a DC grid 100 having few or no HVDC breakers 130. By liming the fault current in case of a fault, fault clearing could at least partly be performed by AC breakers connected at the AC side of the HVDC converters 105. In this implementation of a DC grid 100, the effects of a fault will generally be spread over a larger geographical area of the DC grid 100, than if each object in the DC grid is protected by means of HVDC breakers 130. However, the cost related to providing HVDC breakers 130 for protecting the different objects (such as HVDC lines and HVDC converters) can be reduced or avoided. Examples of objects which are often protected by means of HVDC breakers 130 are HVDC lines 115, connections 110, and HVDC converters 105.

A current limiter could advantageously be series-connected in the connection 110 at the DC side of a HVDC converter 105. When DC switchyards 120 are provided, this location of the current limiter would be in the connection 110 between the HVDC converter 105 and the nearest DC switchyard 120. In this embodiment of a DC grid 100, the current limiter can efficiently limit the contribution from the HVDC converter 105, to which it is connected, to a fault current into the DC grid 100. Thus, upon occurrence of a fault, in the time period between activation of the current limiter and breaking of the current by HVDC breakers surrounding the fault, the current flowing into the fault from the HVDC converter 105 will be limited. Furthermore, the voltage at the DC side of the converter 105 will be held up by means of the current limiter, thus reducing the effects of the fault on the AC system connected at the AC side of the HVDC converter 105.

Figure 2:
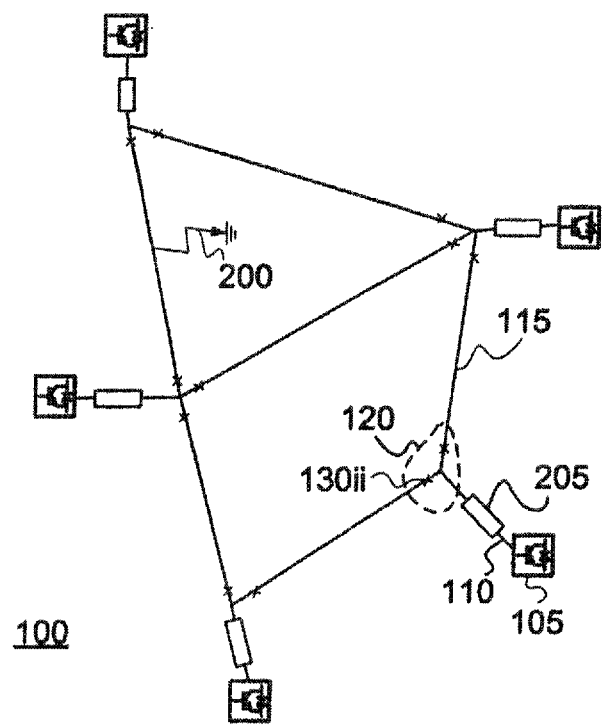
FIG. 2 is a schematic drawing of the DC grid of FIG. 1, where the current limiters have been series connected in the connections between the HVDC converters and the DC switchyards.

An example of a DC grid wherein current limiters 205 are series-connected at the DC side of the HVDC converters 105 is schematically illustrated in FIG. 2. In FIG. 2, a current limiter 205 has been connected at the DC side of all HVDC converters 105 of the DC grid 100. A HVDC converter 105, the connection 110 and the current limiter 205 connected at the DC side of the HVDC converter 105 could be seen to be part of an HVDC converter station. In another implementation of a DC grid, less than all HVDC converters 105, for example only one HVDC converter 105, could have a current limiter 205 connected on its DC side. In FIG. 2, no HVDC breaker 130i is shown in the connections 110 which are provided with a current limiter 205. However, an HVDC breaker 130i could additionally be provided in series with the current limiter 205. Such HVDC breaker 130i could for example be beneficial in order to limit the effects on the DC grid 100 from a fault in the connection 110 or in the HVDC converter 105 if a uni-directional current limiter 205 is used. Since, in case of a fault anywhere in the DC grid 100, the current will flow in the direction from the HVDC converters 105 towards the DC grid (unless the fault occurs between the HVDC converter 105 and the current limiter 205), this is the current direction in which current limiting will be most beneficial. Hence, a current limiter 205 in a connection 110 could be uni-directional with maintained performance, thus saving components as compared to a bi-directional current limiter 205. However, a bi-directional current limiter 205 could also be used. Furthermore, for illustration purposes, no protection systems 135 have been shown in FIG. 2, although such protections systems would typically be present.

A line fault 200 on an HVDC line 115 has been shown in FIG. 2. A line fault is only an example of different faults, the effects of which a current limiter can mitigate.

As mentioned above, by use of a current limiter 205 in the connection 110, the current flowing into the DC grid from the HVDC converter 105 can be kept at a lower level, thus reducing the stress on the components of the DC grid 100, for example on the HVDC breakers 130 which will be used to clear the fault. Moreover, as will be further discussed in relation to FIGS. 6a and 6b, the effects of a current limiter 205 in the connection 110 can be of great benefit also for the operation of the HVDC converter 105 and the AC power system connected to the AC side of the HVDC converter 105.

Figure 3:
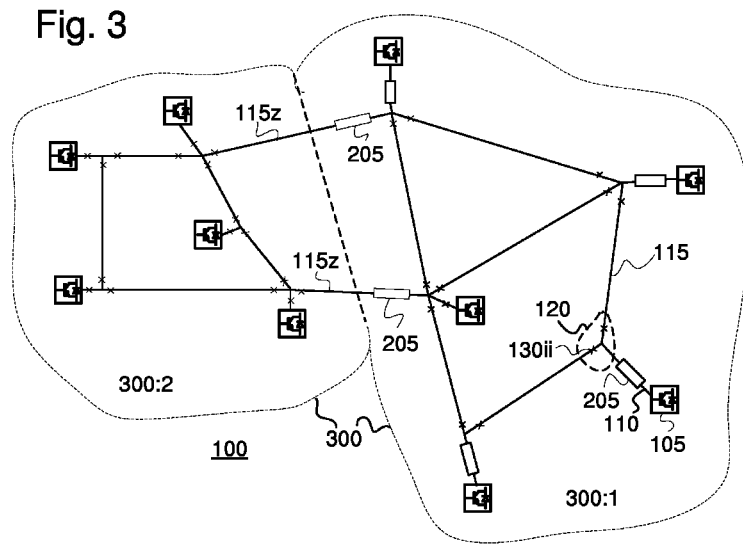
FIG. 3 schematically illustrates a DC grid wherein current limiters are used to divide the grid into two zones, and wherein the HVDC converters of one zone are connected to the DC grid via current limiters.

Current limiters can further be useful also at other locations in the DC grid 100. FIG. 3 illustrates an example of a DC grid 100 wherein the grid has been divided into two zones 300 (zone 300:1 and zone 300:2) by series-connecting a current limiter 205 in each HVDC line(s) 115z by which two zones 300 are interconnected. In FIG. 3, a zone-dividing current limiters 205 are shown to have taken the place of an HVDC breaker 130i. However, an additional HVDC breaker 130i could be provided in series with the zone-dividing current limiter 205. This could for example be beneficial if the current limiter 205 does not have capacity to break a fault current. A zone-dividing current limiter 205 could advantageously be bi-directional, in order to allow for limitation of a fault current flowing into either of the zones 300 interconnected by the current limiter 205.

By dividing the DC grid into different zones which are interconnected by means of a current limiter, the effects of a fault in the DC grid can be limited. If a fault occurs in a first zone, the current limiter(s) that interconnect this first zone 300 with its neighbouring zones will limit the fault current that flows into the fault from the neighbouring zones during the fault-on period, thus reducing the fault current in the zone wherein the fault has occurred. By providing a limited contribution to the fault current through a zone-dividing HVDC line 115z, current from the zones 300 which surround the faulty zone 300 will contribute to the charging of the cables and/or overhead lines in the faulty zone, following clearing of the fault. Thus, normal operation can quickly be resumed also in the zone where the fault occurred, once the faulty object has been disconnected. Moreover, limiting of the fault current will mitigate the effects in the healthy zones surrounding the faulty zone. If the fault current is permitted to flow undisturbed, the DC voltage in the surrounding zones 300 will collapse, making continued power transmission more or less impossible. Such voltage collapse will typically, unless measures are taken, reach a large geographical spread very quickly after a fault has occurred. By limiting the fault-current caused by a fault in a first zone, the DC voltage in the surrounding zones 300 can be essentially undisturbed, and the power transmission in the surrounding zones 300 may continue without major interruption.

Hence, the impact of the fault on AC system stability can be well kept under control. In other words, the power transfer can be maintained in a large portion of the DC grid 100, even if a fault in the DC grid has occurred. Thus, the reserve transfer capacity in the connected AC systems can be substantially decreased compared to a system wherein no current limiters 205 have been implemented in the DC grid. In addition, the fault-on period with depressed voltages and inability to transfer power in the faulty zone can be allowed to be longer and thus, slower and less expensive HVDC breakers 130 can be used within the zones 300.

By combining a current-limiting possibility in the connections 110 with the division of the DC grid 100 into different zones 300, the fault current in a zone 300, wherein a fault has occurred, can be efficiently controlled to an acceptable level.

Once the fault current has been limited by means of the current limiters 205, the HVDC breakers 130 which are connected around the faulty object can clear the fault. The instruction to commence closing the breaker sections 400 will be generated locally by the control system of the respective current limiters 205, as further described below.

The control system arranged to activate current limitation of a current limiter 205 is advantageously independent on the protection systems 135, and vice versa. The tripping of the HVDC breakers 130 in response to a fault will thus be independent on the activation of the current limiter 205. Depending on the implementation, the tripping of the HVDC breakers 130 will be initiated at the same time as, before, or after the activation of the current limiters 205. The activation and control of the current limiter 205 can advantageously be trigger in dependence of local measurements of voltage/and or current, obtained at the location of the current limiter 205.

In the DC grids 100 shown in FIGS. 2 and 3, the current limiters 205 have taken the place of the HVDC breaker 130 at one end of the HVDC connection in which the current limiters 205 have been connected. If a fault in the HVDC connection occurs in such configuration, the current limiter 205 could advantageously operate to break the current in order to interrupt the current flowing into the fault. In one implementation, a protection system 135 is provided which is arranged to instruct the current limiter 205 to break the current in this situation. The control system for controlling the limitation strength of the current limiter 205, further discussed in relation to FIG. 5, should advantageously be independent of such protection system 135, in order to improve secure operation of the DC grid 100. In an alternative configuration, a HVDC connection in which a current limiter 205 is provided could be equipped with two HVDC breakers 130, in addition to the current limiter 205. In this configuration, if fault the HVDC connection were to occur, it would be sufficient for the current limiter 205 to provide sufficient current limitation to reduce the impact of the fault.

Figure 4A:
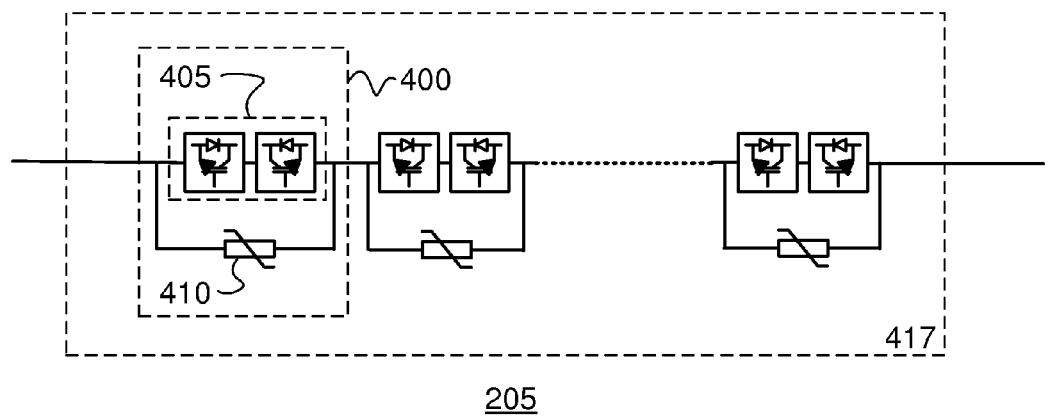
FIG. 4*a* illustrates an example of a current limiter based on a series connection of independently controllable breaker sections.

A high speed semi-conductor current limiter has been described in EP0867998, and an example of such a current limiter 205 is shown in FIG. 4a. The current limiter 205 of FIG. 4a comprises a set of n series-connected breaker sections 400, where each breaker section comprises a parallel connection of a non-linear, voltage-dependent resistor 410 and a semiconducting switch 405 of turn-off type. The breaker sections 400 can be controlled independently of each other. Here, a breaker section 400 having a semi-conducting switch 405 which is closed will be referred to as a closed breaker section 400, and vice versa. The different breaker sections 400 could be identical, although this is not a requirement.

The current limiter 205 shown in FIG. 4a is bi-directional, where the semi-conducting switch 405 is a series connection of two anti-parallel, uni-directional switches of turn-off type, each being connected in anti-parallel with a rectifying element (e.g. a diode). Other ways of obtaining a bi-directional current limiter 205 may be contemplated, such as using a bi-directional 405, or series-connecting two uni-directional current limiters in anti-parallel to form the current limiter 205. As mentioned above, a uni-directional current limiter 205 can advantageously be used in some applications of the current limiter 205, in which case a semi-conducting switch 405 could comprise one uni-directional switch of turn-off type connected in anti-parallel with a rectifying element. A semiconducting switch 405 of turn-off type could for example be of IGBT type (insulated-gate bipolar transistor), of IGCT type (integrated gate-commutated thyristor) or of GTO (gate turn-off thyristor) type. All these types belong to the group of power semiconductor switches with turn-on and turn-off capability, and other switches belonging to this group could also be used. (Typically, a semiconducting switch 405 is typically formed be a series- and/or parallel connection of a number of switching units.) The non-linear resistor 410 could for example be an arrestor, and could be made from e.g. zinc oxide or silicon carbide.

The fault current limitation functionality of the current limiter 205 of FIG. 4a is obtained by blocking the switches 405 in only a subset of the n sections (hereinafter, a breaker section 400 wherein the semi-conducting switch 405 is in a blocking state will be referred to as an open breaker section 400). The non-linear resistors 410 of the open section 400 set up a voltage which counteracts the flow of current through the non-linear resistors 410. The higher number of sections 400 that are opened, the smaller the current will be, with zero current as the extreme. By opening a suitable subset of the n series connected breaker sections 400, the counter voltage across the corresponding arrestors can be made smaller than the voltage required to break the current, but large enough to limit the current to a suitable level. However, as long as the current is only limited (rather than broken), the non-linear resistors 410 in the subset of open sections 400 will dissipate energy. The number n of sections 400 and the Switching Impulse Protection Level (SIPL) of each non-linear resistor 410 will determine the maximum voltage for which a current may be broken. In order to ensure that a fault current can be broken, the number n of section 400 could advantageously reach or exceed the number required for breaking a current at nominal voltage. However, if only current limiting properties are desired, and no breaking operation is expected from the current limiter 205, a smaller number of sections 400 could be used. A current limiter 205 which is capable of breaking the current can be referred to as a current limiting breaker.

On occurrence of a fault, the current limiters 205 will switch in non-linear resistors 410, to limit the current flowing through the current limiter 205 so that it falls below a certain level. As the current limiter 205 reduces the current by building up voltage across the non-linear resistors 410 of the open sections, the voltage at the side of the current limiter 205 will be maintained at a voltage close to the normal voltage, instead of dropping drastically.

Figure 4B:
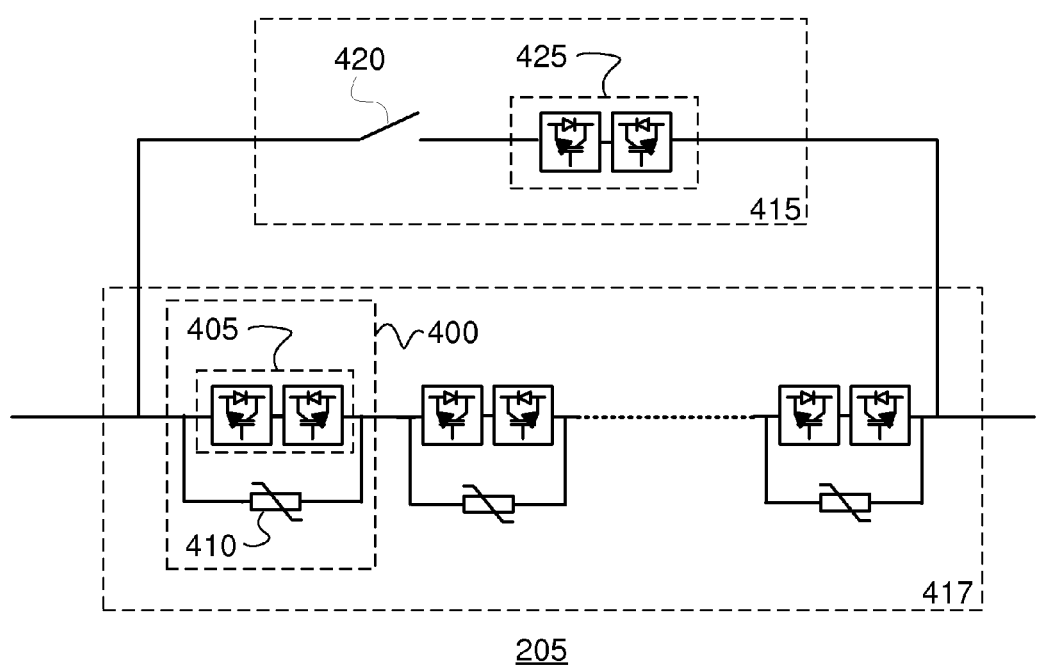
FIG. 4*b* illustrates an example of a current limiter including a transfer switch.

FIG. 4b schematically illustrates an alternative embodiment of a current limiter 205 of high speed, where the current limiter 205 of FIG. 4b comprises a transfer switch 415 which is connected in parallel with the series connection of breaker sections 400. The series connection of breaker sections 400 can in this configuration be referred to as the main switch 417. The transfer switch 415 comprises a series connection of an auxiliary switch 425 and a disconnector 420. During normal operation, the auxiliary switch 425 and the disconnector 420 are closed, so that the current through the current limiter 205 flows through the transfer switch 415 rather than through the main switch 417. The sections 400 of the main switch 417 can advantageously be open during normal operation.

Upon activation of the current limiter 205, either to limit or break the current, the auxiliary switch 425 will be opened so that the current is commutated to the main switch 417. Before the auxiliary switch 425 is opened, the main switch 417 should be closed, if not closed during normal operation. When the auxiliary switch 425 has been opened to commutate the current to the main switch 417, the disconnector 420 will be opened, in order to isolate the auxiliary switch from any high voltages which will occur across the main switch 417. A suitable number of breaker sections 400 will then be activated in that the semi-conducting switch 405 of these breaker sections 400 will act to block the current, thus forcing the current to flow via the non-linear resistors 410. The main switch 417 of the current limiter 205 of FIG. 4b should not be activated until the disconnector 420 has been opened. Thus, a current limiter 205 which has a transfer switch 415 is generally slower than a current limiter 205 having a main switch 417 only. However, an indication that a fault has occurred will often have to be analyzed before a decision to limit (or break) the current will be taken. By using the time between receipt of such fault indication and the decision making for a preparatory opening of the transfer switch 415, the activation of the main switch 417 can often take place immediately upon a decision having been made.

Advantageously, the opening of the transfer switch 415 could be performed upon receipt of a fault indication, and the activation of the main switch 417 upon receipt of a main switch activation decision. If no such decision is received, e.g. within a certain period of time, the transfer switch 415 could be closed.

The additional time required for opening of the transfer switch 415 may be beneficial for protection algorithms based on derivatives of voltages and/or currents, since the opening the transfer switch 415 would provide a time window with quickly changing currents and voltages, before current limitation occurs. Protection algorithms based on time derivatives would then be given time to identify the fault, and to send trip signals to the appropriate DC breakers 130. When no transfer switch 415 is provided, a time delay of appropriate duration could be introduced for this purpose, if desired. For some protection algorithms, such as differential protection algorithms, such time window of quickly changing currents and voltages are of no additional benefit.

The disconnector 420 of a transfer switch 415 should preferably be fast. Since there will be no current through the disconnector 420 while opening, a fast mechanical disconnector is somewhat easier to design than a fast mechanical breaker for breaking a current. An example of a suitable design of the disconnector 420 is disclosed in EP1377995.

By letting the current flow through the transfer switch 415 during normal operation, the power loss in the current limiter 205 can be considerably reduced as compared to a current limiter 205 having only the main switch 417. The auxiliary switch 425 can be considerably smaller than the main switch 417, and thus considerably less power consuming. However, in relation to the present invention, the transfer switch 415 is optional.

Figure 5:
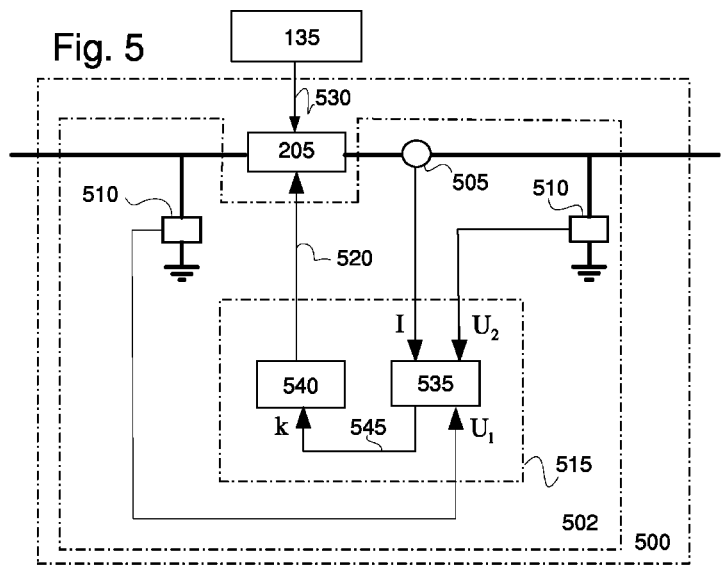
FIG. 5 illustrates an example of current-limitation system comprising a current-limiter and a control system arranged to control the current-limiting strength of the current limiter, where the control system comprises a limitation-determination system.

An advantage of using current limiters 205 based on a series connection of breaker sections 400 is that the current-limiting strength can easily be adjusted. Furthermore, if a sufficient number of breaker sections 400 are provided, such current limiter 205 can operate to break the current. However, this current limiter type is given as an example only, and other types of current limiting devices may be used, such as super-conducting conductors FIG. 5 provides an illustration of an example of a current limitation system 500 comprising a current limiter 205 and a control system 502 for controlling the current limiter 205 which is connected in a HVDC connection. The control system 502 comprises a current measurement device 505 arranged to measure the current through the current limiter 205 and to generate a signal I indicative of the measured current. The control system 502 further comprises a voltage measurement device 510 arranged on each side of the current limiter 205, arranged to measure the voltage on each side of the current limiter 205 and to generate a signal $U_1$ and $U_2$, respectively, indicative of the voltage on a first and second side of the current limiter, respectively. The current measurement device 505 could for example be an optical current transducer (OCT) or a DC current feedback compensation transducer (DCCT), or any other suitable current transducer or sensor. The voltage measurement devices 210 could for example be direct voltage divider, or any other suitable voltage measurement device. As will be seen below, the voltage measurement devices and the inputs for receiving the signals $U_1$ and $U_2$, respectively, could be omitted in some embodiments of the control system 502.

The control system 502 further comprises a limitation-determination system 515, arranged to receive signals I, $U_1$ & $U_2$ and to generate a control signal 520 to be delivered to the current limiter 205, the control signal 520 being indicative of the number of breaker sections 400 to be opened/closed. Thus, the input of the limitation-determination system 515 of FIG. 5 is connected to the respective outputs of the current measurement device 505 and the voltage control devices 510, while the output of the limitation-determination system 515 is connected to a control input of the current limiter 205.

The connections for transmitting the signals I, $U_1$, $U_2$, 520 and 530 are typically wired connections in order to obtain sufficient speed and reliability, although wireless connections could also be contemplated.

The limitation-determination system 515 of FIG. 5 is shown to include a limitation strength determination mechanism 535 and a control signal generator 540. The limitation strength determination mechanism 535 is arranged to determine whether the present limitation strength of the current limiter 205 should be increased or decreased. For the control of a current limiter 205 having a set of series connected breaker sections 400 as shown in FIGS. 4a and 4b, the limitation strength determination mechanism 535 is arranged to determine whether the number k of open breaker sections 400 should be increased or decreased. The limitation strength determination mechanism 535 is furthermore arranged to deliver, to the control signal generator 540, a signal 545, indicative of the currently required limitation strength (or, alternatively, of a variation in the required limitation strength). When the current limiter 205 is a current limiter having n independently controllable breaker sections 400, the signal 545 will be indicative of the number k of breaker sections that should be open (or, alternatively, of variations in the number k).

The control signal generator 540 is arranged to generate a control signal 520 in response to a signal 545 indicative of a change in the desired number k of open breaker sections 400. In case of the current limiter 205 being breaker-section based (cf. FIGS. 4a and 4b), the control signal generator 540 could furthermore be arranged to select which of the breaker sections 400 should be open or closed. The operation of the control signal generator 540 will be further discussed in relation to FIG. 9.

The current limiter 205 could advantageously be further connected to a protection system 135, as shown in FIG. 5. Protection system 135 is preferably independent of control system 502, and arranged to detect a fault 200 which would require that the current limiter 205 was opened, i.e. that the current limiter 205 broke the current. Such fault 200 could for example be a line fault along a HVDC connection in which the current limiter is connected, or a fault in the DC switchyard 120 to which the current limiter 205 is connected. Upon detection of such fault, protection system 135 would send a tripping signal 530, in response to which the current limiter 205 would break the current—in the current limiters 205 of FIGS. 4a and 4b, this would involve sending a tripping signal to the semiconducting switch 405 of each of the breaker sections 400 (or at least, in case of redundant breaker sections 400, to a sufficient number of breaker sections 400 to set up a sufficient voltage to break the current).

In a configuration wherein a HVDC connection is equipped with two HVDC breakers 130, in addition to the current limiter 205, no protection system 135 has to be connected to the current limiter 205 the protection system 135. Instead, both HVDC breakers 130 could be connected to a protection system 135. In this configuration, the number of sections 400 of a section-based current-limiter 205 does not have to be sufficient to set up a voltage capable of breaking the current, but the number of sections could be designed for current-limitation scenarios only.

Although current limiters 205 of any suitable design could be used in the present invention, it will hereinafter be assumed, for illustrative purposes, that current limiters 205 based on independently controllable breaker sections 400 are used.

Figure 6A:
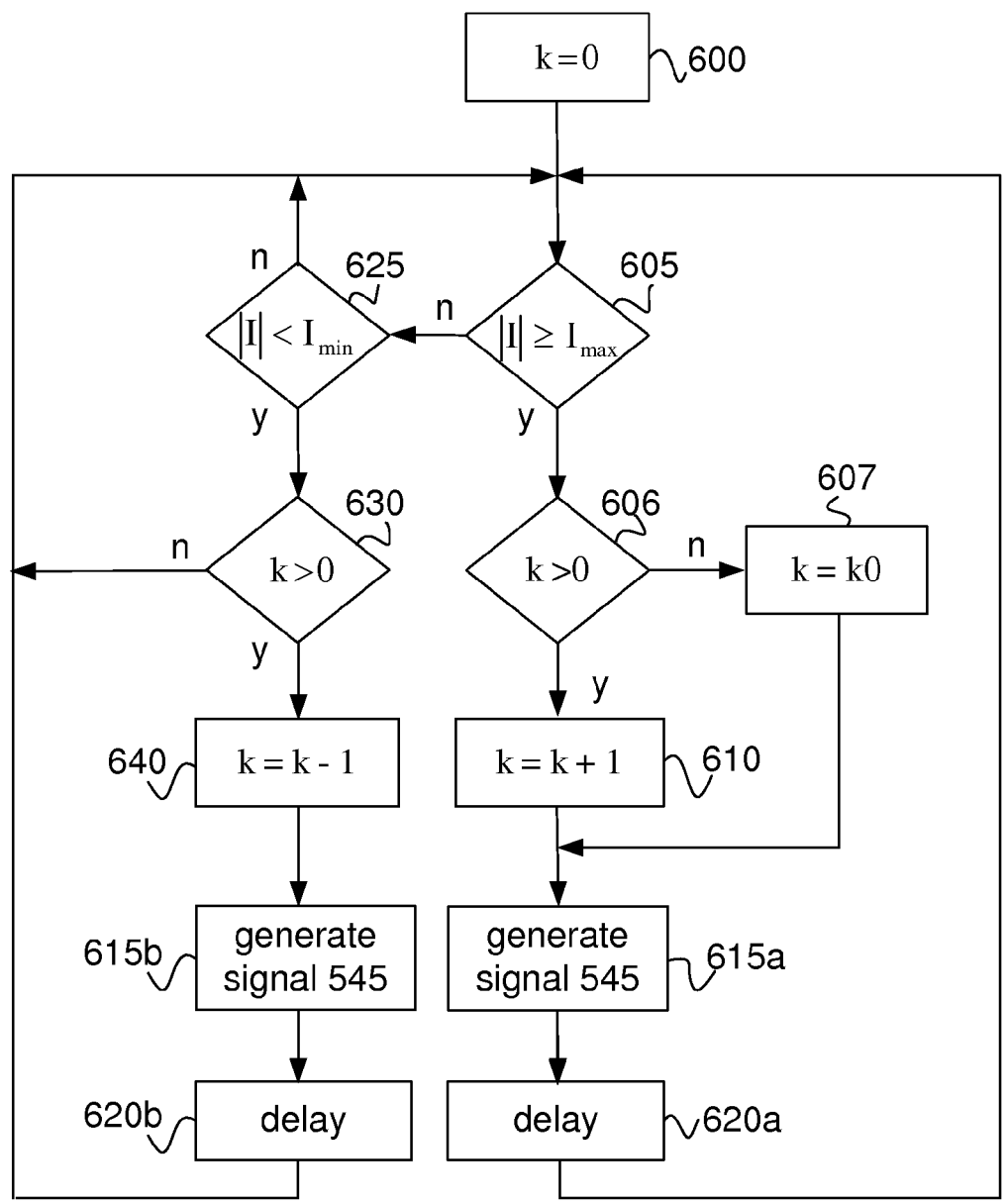
FIG. 6*a* is a flowchart illustrating an embodiment of a method of determining the required current-limiting strength of a current limiter for the case when the regulation range lies above the rated current of the transmission.

The operation of different embodiments of the limitation strength determination mechanism 535 will now be discussed. The limitation strength of the current limiter 205, which is here determined by the number k of open breaker sections 400, can for example be controlled in dependence on measurement of the present current I through the current limiter 205, i.e. in dependence on a value conveyed to the limiting strength determination mechanism 535 by the signal I. An example of a determination process is illustrated in FIG. 6a, wherein the number k of open breaker sections 400 is controlled to regulate the current I through the current limiter 205 to lie within a regulation range: $I_{min}<|I|<I_{max}$. The regulation range represents a desired current range in case of a fault—in case of a detected fault, if the current lies above $I_{max}$, at least one breaker section 400 is opened (unless all are already open); and if a current lies below $I_{min}$, at least one breaker section 400 is closed (if any are open).

At step 600 of FIG. 6a, the process is initiated in that the parameter k, indicating the number of breaker sections 400 that should be open, is set to zero. Typically, this step is first entered when the current limiter 205 is initiated for normal operation. In step 605, it is then checked whether the present current I exceeds the current threshold representing the maximum current level of the regulation range, $I_{max}$. If so, step 606 is entered, wherein it is checked whether the number of open breaker sections 400, represented by the number k, exceeds zero. If not, i.e. if no breaker sections 400 are open, the k is set to a predetermined number k0, which can for example be chosen such that the voltage across the k0 non-linear resistors 410 will approximately correspond to the nominal voltage or the rated voltage. Hence, if no breaker sections 410 are switched in upon entry into step 605, a predetermined number k0 will be switched in step 607. Step 615a is then entered, wherein a signal 545 indicative of k is generated and sent to the control signal generator 540. Step 620a is then entered, wherein a delay is introduced in order to let the current level adjust to the new voltage situation. After the delay step 620a, step 605 is re-entered.

If in step 606 it is found, on the other hand that k already exceeds zero, then step 610 is entered, wherein the number k, representing the desired number of open breaker sections 400, is incremented by one. Step 615a is then entered.

If in step 605 it is instead found that the present current level I lies below $I_{max}$, then step 625 is entered, where it is checked whether I is below a current threshold representing the minimum current of the regulation range, $I_{min}$. If not, no action is required and step 605 is re-entered. However, if the present current level I is found to lie below $I_{min}$, then step 630 is entered, wherein it is checked whether k has a value larger than 0. If not, the limitation strength of the current limiter 205 cannot be reduced further, and step 605 is therefore re-entered. However, if k>0, indicating that at least one breaker section 400 is open, then step 640 is entered, wherein the value of k is reduced by one. Step 615b is then entered, wherein a signal 545 indicative of k is generated and sent to the control signal generator 540, prior to entering the delay step 620b. After step 620b, step 605 is re-entered.

Once a fault has been disconnected by HVDC breakers 130 on either side of the fault, the DC voltages on the faulty side of the current limiter 205 will start to increase and the fault-current contribution from surrounding parts of the DC grid 100 will tend to go below the lower threshold $I_{min}$, at which time the open breaker sections 400 will start to close to maintain the current within the two thresholds. Once all sections are closed, normal operation is resumed.

The regulation range $[I_{min}, I_{max}]$ could be set to lie entirely above the rated current of the transmission, $I_{rated}$; the regulation range could be set to lie entirely below the rated current, $I_{rated}$; or the regulation range could be set so that $I_{rated}$ falls within the regulation range. The rated current of the transmission, $I_{rated}$, is here typically the rated current of the HVDC connection in which the current limiter 205 is connected, depending on the dimensioning of the components of the DC grid 100.

In the current regulation process illustrated in FIG. 6a, the present level of the current I is the determining factor for whether or not the limitation strength of the current limiter 205 should be altered. If I lies below the minimum current of the regulation range and there are no open breaker sections 400, then no further action will be taken to amend the current. In other words, if the current level is at or below the rated current, the current limiter 205 will not act to amend the current level when the regulation range lies above the rated current. Hence, if a fault has occurred and later been cleared, the process in FIG. 6a would operate to return the present current level to the current level during normal operation. Thus, the current regulation process of FIG. 6a is suitable if the rated current $I_{rated}$ lies below the regulation range. As can be seen in FIG. 6a, no information on the voltage on either side of the current limiter 205 is required, and thus, when the regulation range lies entirely above the rated current, the voltage measurement devices 610 could be omitted from the control system 502. However, if desired, voltage measurements as well as current measurements could be used to detect a fault situation.

However, when the rated current lies above the regulation range, the situation is different, and the fact that the current has exceeded the maximum current of the regulation range is not an appropriate indication that the current limiter 205 should be activated. The method illustrated in FIG. 6a would in this situation regulate the current to lie below the rated current (within the regulation range), upon occurrence of a fault, as well as during normal operation before any fault has occurred & after a fault has been cleared. In order to avoid such undesired suppression of the current during normal operation, an additional condition could be included in the method of FIG. 6a. Such additional condition could for example be based on the voltage level on one or both sides of the current limiter 205, depending on whether the current limiter is uni-directional or bidirectional.

Figure 6B:
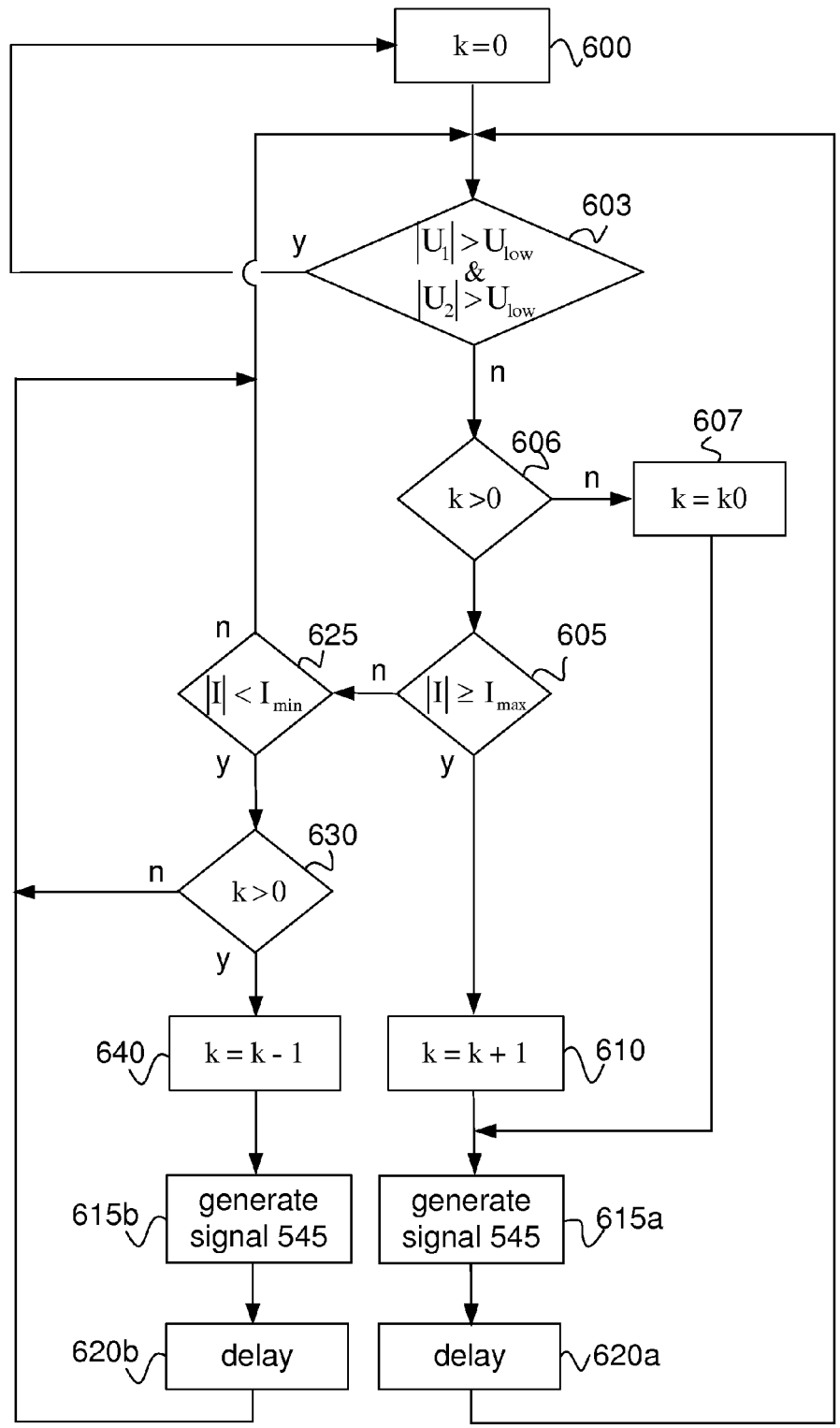
FIG. 6*b* is a flowchart illustrating an embodiment of a method of determining the required current-limiting strength of a current limiter for the case when the maximum current of the regulation range lies above or below the rated current of the transmission.

An embodiment of the regulation process discussed in relation to FIG. 6a, to which a check of such additional condition has been added, is shown in FIG. 6b. The embodiment of FIG. 6b comprises step 603, which is entered after step 600, prior to entering step 605. In step 603, it is checked whether both the voltage $U_1$ on a first side of the current limiter and the voltage $U_2$ on the second side of the current limiter 205 exceed a lower voltage level $U_{low}$. If so, it is concluded that no fault has occurred which requires current limitation, and step 600 will be re-entered. However, if it is found in step 603 that the voltage level on either side of the current limiter 205 (or both sides) has fallen below the lower voltage level $U_{low}$, this is an indication that a fault has occurred and that the current limiter 205 should be activated. Step 606 is then entered. $U_{low}$ could for example lie within the range $0.1U_{rated}<U_{low}<0.8U_{rated}$. In step 606, it is checked whether k exceeds zero. If not, i.e. if no breaker sections 400 are open, then k is set to a predetermined number k0, which can for example be chosen such that the voltage across the k0 non-linear resistors 410 will approximately correspond to the rated voltage. Step 615a is then entered, wherein a signal 545 indicative of k is generated and sent to the control signal generator 540. Step 620a is then entered, wherein a delay is introduced in order to let the current level adjust to the new voltage situation. After the delay step 620a, step 603 is re-entered.

If it is found in step 606, on the other hand that k already exceeds zero, then step 605 is entered, wherein the number k, representing the desired number of open breaker sections 400, is incremented by one. Step 615a is then entered.

Once step 605 has been entered, the procedure is similar to the procedure of FIG. 6a. However, rather than re-entering step 605 after the delay in step 620a/620b, or after a negative conclusion in step 625 or 630, step 603 is re-entered to ensure that the fault is still present. Thus, in the fault-current-strength determination method of FIG. 6b, the voltage level at the current limiter 205 is used as an indicator of a fault situation, while in the method of FIG. 6a, the current level through the current limiter 205 is used as such indicator. As can be seen, in an embodiment wherein the desired fault-current range lies below the rated current, measurements of the voltages $U_1$ and $U_2$ on the respective sides of the current limiter 205 are useful.

If it is concluded in step 603 that the voltage on both sides exceeds $U_{low}$, this indicating that the fault has been cleared, the limitation-strength indicator k is set to zero in step 600. Thus, the current limiter 205 is deactivated. In an alternative implementation, the limitation-strength indicator k will be gradually be reduced to zero after a finding in step 603 that the voltage exceeds $U_{low}$.

The regulation method of FIG. 6b is suitable also when the regulation range includes the rated current of the transmission, $I_{rated}$. By introducing the condition of step 603, it is ensured that the current limiter 205 will be inactive during normal operation. If desired, the regulation method of FIG. 6b could be used also when the regulation range lies below the rated current $I_{rated}$. As will be discussed in relation to FIG. 9, the regulation range could include the extreme case where the current is limited to zero.

In the regulation methods illustrated in FIGS. 6a and 6b, the magnitude of the current and/or voltage is used as a basis for determining whether a fault has occurred, and thus whether or not to limit the current. The direction (sign) of the current, on the other hand, can advantageously be used in order to determine in which direction a closed breaker section 400 should be blocked, in case a bi-directional current limiter 205 is used.

To regulate the fault current through a current limiter 205 so that it falls within a regulation range above the rated current level has the advantage of providing a higher charge of the cables and/or overhead-lines forming the HVDC lines 115 in the DC grid 100 once the fault has been cleared. This is particularly advantageous when the current limiter 205 is connected as a zone-dividing current limiter 205 to define a zone border.

To regulate the fault current through a current limiter 205 so that it falls within a regulation range below the rated current level, on the other hand, results in a lower power loss in the current limiter(s) 205, thus allowing for a less heat-resistance design of the current limiter(s) 205 (e.g. a simpler design of the non-linear resistors 410 of the current limiters 205 shown in FIGS. 4a and 4b) and/or for a longer period of time during which a current limiter 205 can carry a current (thus facilitating for the use of slower HVDC breakers 130). A lower fault-current level also yields a lower requirement on current-breaking capacity of the HVDC breakers 130.

When the current limiter 205 is located in a connection 110 connecting a VSC converter 105 to the DC grid 100, the maximum current of the regulation range, $I_{max}$, could advantageously lie below the converter blocking-level, so that the switches of the VSC converter can stay in operation also during a fault-on period. Furthermore, it would be advantageous to set the maximum current of the regulation range to lie below the rated current when the current limiter 205 is located in a connection 110 of a VSC converter 105. By regulating the current in case of a fault so that it falls below the rated current, it can be ensured that the active power delivered to the DC grid during the fault falls below the rated power of the VSC converter, thus allowing VSC converter to continue to control the reactive power exchange with the AC power system also during the fault-on period, and thus to provide support of the AC system voltage. This will be beneficial for AC system stability. The amount of reactive power that a HVDC converter 105 will be capable of delivering to the connected AC power system will depend on the difference between the fault current through the connection 110 and the rated current of the HVDC converter 105—the larger this difference, the higher the amount of reactive power that can be delivered to the connected AC power system, thus facilitating for efficient control of the AC voltage in a manner so that the disturbances on the connected AC power system resulting from the fault in the DC grid will be minimized.

Depending on which of the above advantages is/are most desired in a particular application of a current limiter 205, the regulation range could be selected to lie above or below the rated line current, or to include the rated current, $I_{rated}$.

The processes illustrated by FIGS. 6a and 6b are examples only and could be varied in different ways. For example, the increment of k made in step 610 could differ from one, and could for example depend on the difference between $I_{max}$ and the present value of I—if the difference is large, then k could be incremented by a higher number of steps than if the difference is small. Similarly, the decrease of k in step 640 could be larger than one, and could e.g. be made dependent on the difference between $I_{min}$ and the present value I. Moreover, the signal 545 could be indicative of the desired change in k, rather than of k itself. Furthermore, in another type of current limiter 205, step 610 (640) could represent another means of increasing (decreasing) the limitation strength of the current limiter 205. The parameter k in FIG. 6a is used to represent the number of open breaker sections 400. However, in the general case, the parameter k represents a measure of the present limitation strength of the current limiter 205, and can be referred to as a limitation-strength indicator. The signal 545 could be referred to as a limitation-strength signal 545.

Step 606 and 607 of FIGS. 6a and 6b serve to give the current limitation a kick start, by opening a pre-determined number of breaker sections. In another implementation, k can for example be given a value in step 607 which depends on the time derivative of the current and/or voltage. In yet another implementation, steps 606 and 607 could be omitted, and the current-limiting strength could be determined in steps 610 and 640 only.

The delay steps 620a and 620b could be implemented as identical steps. However, depending on the inductance of the DC grid 100, it could be beneficial to use different durations of the delay in the cases of incrementing (620a) and decrementing (620b) the limitation strength indicator k. It might for example be beneficial to have a shorter delay when the current lies above $I_{max}$, so as to ensure that a fault current does not rise at an undesired rate, whereas when the current is decreased, it might be beneficial to use a longer delay period, so that the current can stabilize and unnecessary switching in-and-out of the current limitation strength. Hence, in one embodiment, the duration of the delay is shorter in step 620a than in step 620b. As a non-limiting example, the duration of the delay in steps 620a and 620b could lie within the range of 50 μs-10 ms. However, other durations of the delay could be used.

Figure 7:
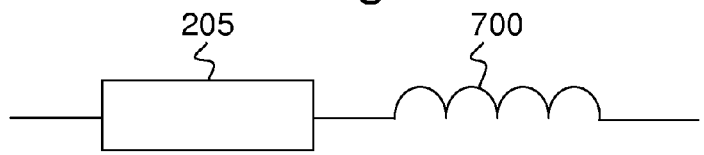
FIG. 7 is an example of a configuration wherein a current limiter is connected in series with a reactor to reduce the time derivative of the current upon regulation of the current-limiting strength.

In one implementation of the invention, a reactor 700 is connected in series with the current limiter 205, as shown in FIG. 7. By connecting a reactor 700 in series with the current limiter 205, the time derivative of the current will be reduced. This could for example be beneficial in a scenario where a fault has occurred in a location such that the inductance of the fault-current path is low, and where none of the available values of k will keep the fault current within the regulation range. A reactor 700 in series with the current limiter 205 could in this scenario prevent a high frequency of switching between different values of k. Since the switching of semiconducting switches 405 typically generates heat, it might for cooling purposes be desirable to keep the switching frequency low. The inductance of a reactor 700 could for example lie within the range from around ten to some hundred mH.

The different embodiments of the process performed by the limitation strength determination mechanism 535 shown in FIGS. 6a and 6b only relate to the operation of a main switch 417 of a current limiter 205. However, as discussed in relation to FIGS. 4a and 4b, it is often useful to use current limiters 205 further comprising a transfer switch 415. The process described by the embodiments in FIGS. 6a and 6b applies also to a current limiter 205 having a transfer switch 415, once the transfer switch 415 has been opened and the current has been commutated to the main switch 417.

Figure 8B:
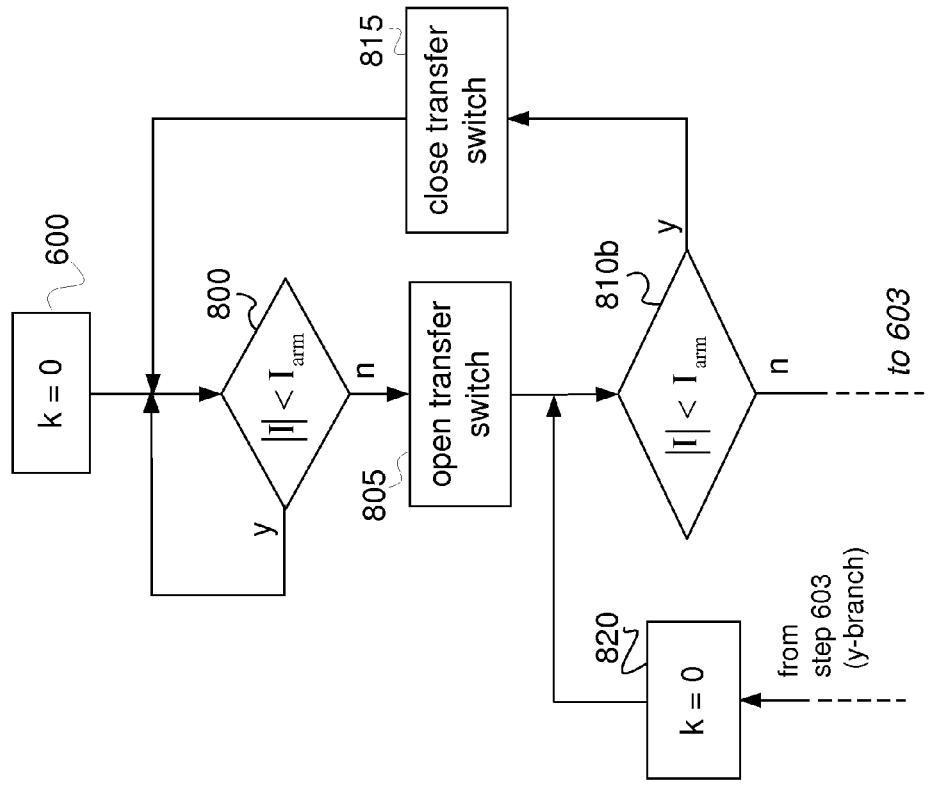
FIG. 8*b* shows a flowchart illustrating another example of a method of controlling a transfer switch.
Figure 8A:
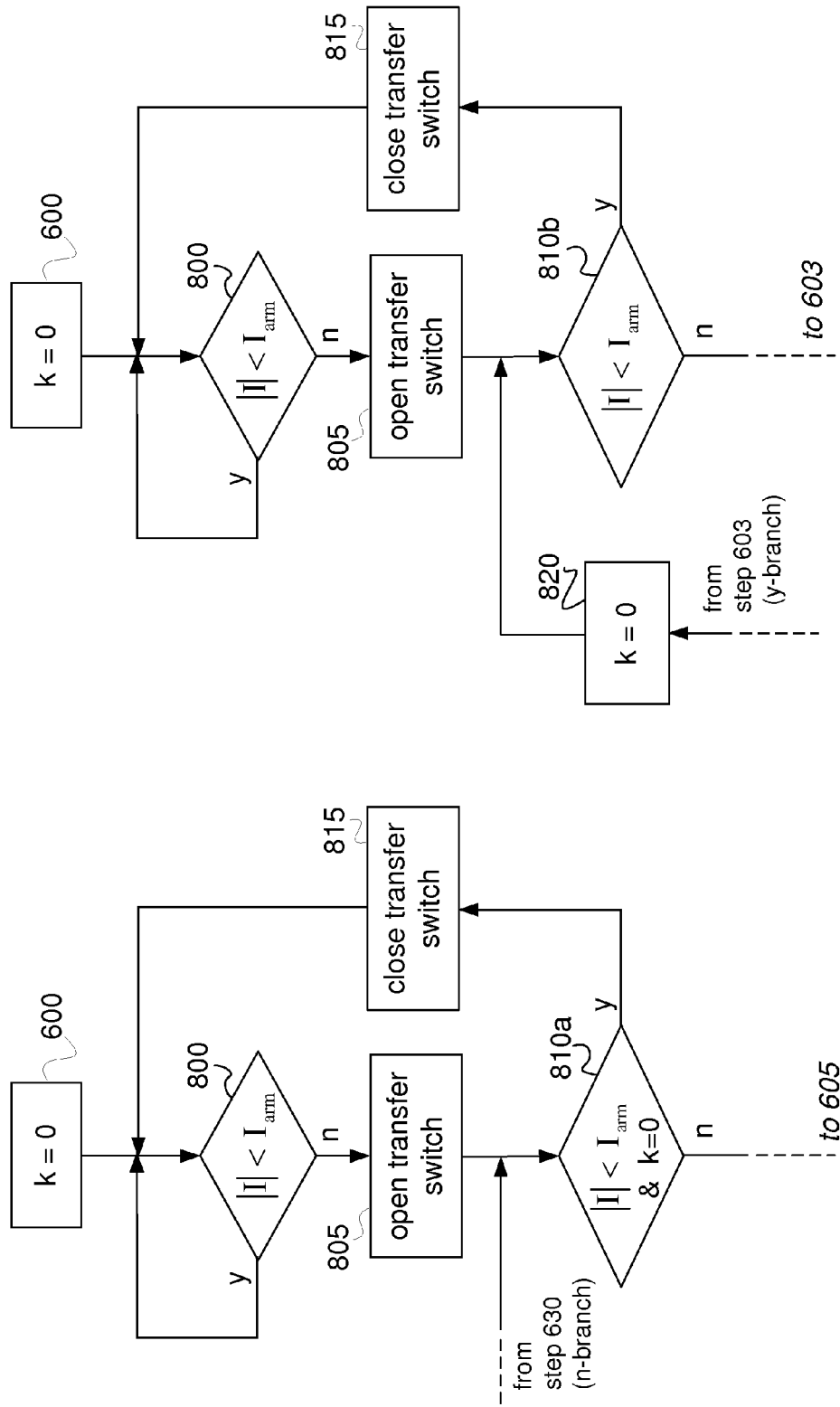
FIG. 8*a* is a flowchart illustrating an example of a method of controlling a transfer switch.

An embodiment of a process for opening the transfer switch 415 is illustrated in FIG. 8a. The process of FIG. 8a could advantageously be used together with the process shown in FIG. 6a for determining the limitation strength when the regulation range lies above the rated current of the transmission.

The process of FIG. 8a is based on the idea that the transfer switch 415 should be opened (corresponding to "arming" the current limiter 205) when a first indication of a fault is detected, where the first indication is received at an earlier stage than the fault detection of step 605. This fault indication is therefore generally less certain, but since opening the transfer switch 415 does not affect the operation of the DC grid 100 other in that the power consumption increases during a short period of time, an incorrect opening of the transfer switch is acceptable.

At step 600 of FIG. 8a, the parameter k is first set to zero, as discussed above in relation to FIG. 6a. Step 800 is then entered, wherein it is checked whether the present current level is below the arming current level, $I_{arm}$. If so, step 800 is re-entered. However, if the magnitude of the present current has risen above $I_{arm}$, step 805 is entered, wherein the transfer switch 415 is opened. In step 810a, it is checked whether the present current is below $I_{arm}$ and the limitation-strength indicator k takes the value zero. If so, the transfer switch 415 is closed, and step 800 is re-entered. If not, the main switch activation decision step is entered (cf. step 605 of FIG. 6a), wherein the process of determining the appropriate limiting strength of the current limiter 205 is commenced.

Step 810a can be seen as superfluous when entered directly after step 805, and can then be omitted. However, step 810 can advantageously be entered also after having found, in step 630, that the limitation-strength indicator k is zero while the current lies below the minimum current in the regulation range. In this situation, the current-limiting functionality of the current limiter 205 is no longer active, and a check as to whether the transfer switch 415 should be closed could advantageously be made. In this situation, if the current still lies above $I_{arm}$, it would be advantageous to keep the transfer switch 415 in an open state, in order to quickly be able to limit the current again, if needed. However, if $I_{arm}$ lies above the minimum current of the regulation range, or if such precautionary maintaining of the transfer switch 415 is not desired, step 815 could be entered directly after having determined in step 830 that k has taken the value zero.

FIG. 8b illustrates an example of a process for opening of the transfer switch 415 which could for example be used together with the process shown in FIG. 6b for determining the limitation strength when the regulation range lies below or partly below the rated current of the transmission. The process of FIG. 8b is similar to that of FIG. 8a. After the limitation-strength indicator has been set to zero in step 600, step 800 is entered, wherein it is checked whether the current lies below the arming current, $I_{arm}$. If so, step 800 is re-entered. If the current level is larger than $I_{arm}$, the transfer switch is opened in step 805. Step 810b is then entered, wherein it is checked whether the current level lies below the arming current. If so, step 815 is entered, wherein the transfer switch is closed. Step 800 is then re-entered. However, if it is found in step 810b that the current lies above $I_{arm}$, the main switch activation decision step is entered (cf. step 603 of FIG. 6b), wherein the process of determining the appropriate limiting strength of the current limiter 205 is commenced.

Similar to FIG. 8a, step 810b could be omitted if entered directly after the transfer switch has been opened in step 805. However, step 810b could advantageously be entered also when it has been determined in step 603 that the voltage at both sides of the current limiter 205 lies above the lower voltage level $U_{low}$. In this situation, the current-limiting functionality of the current limiter 205 should be de-activated, and a check as to whether the transfer switch 415 should be closed could advantageously be made. A step 820 could be introduced, which is entered from the y-branch of step 603, prior to entering step 810b. In step 820, the current-limiting strength indicator k is set to zero. Hence, by entering step 820 instead of step 600 after a positive decision in step 603, steps 800 and 805 does not have to be performed in a situation where the transfer switch 415 will definitely be open. In FIG. 8b, the step 810 differs from step 810a of FIG. 8a in that no check as to whether k is zero is performed, since k has been set to zero in step 820. However, a k-check could be made also in step 810b, if desired.

The procedures of FIGS. 8a and 8b are examples only, and could be altered in different ways. For example, in one implementation of FIG. 8a, the check of step 810a is omitted, and step 815 is entered directly after a negative decision in step 630. Similarly, the check of step 810b could be omitted in FIG. 8b, and step 815 could be entered directly after a positive decision in step 603—in this implementation, step 820 could either be included, or omitted.

In FIGS. 8a and 8b, the first indication of a fault is represented by the present current level, I, raising above an arming current level, $I_{arm}$, $I_{arm}$ could e.g. in the range $I_{rated} < I_{arm} < 2 I_{rated}$. An alternative representation of the first indication of a fault could be that the voltage at either side of the current limiter 205 falls below an arming voltage level, $U_{arm}$. $U_{arm}$ could for example lie in the range $0.5 U_{rated} < U_{arm} < 0.8 U_{rated}$.

If desired, a different threshold could be used for closing the transfer switch 415 than for opening the transfer switch 415, so that the threshold of step 810a/810b is higher than that of step 800 when the current is used as a first indication of a fault, or lower than that of step 805 when the voltage is used as a first indication of a fault.

Figure 9:
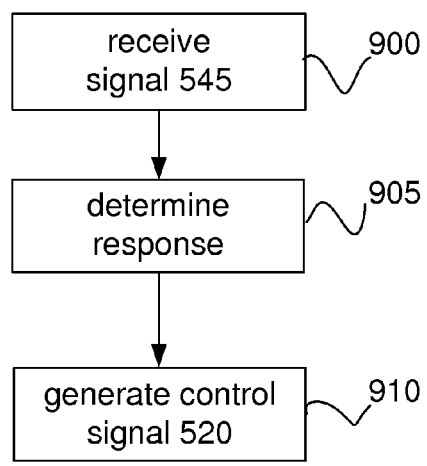
FIG. 9 shows a flowchart illustrating an embodiment of a process for generating control signals to send to a current limiter once the required limiting strength has been determined.

An embodiment of a process performed by control signal generator 540 is schematically illustrated in the flowchart of FIG. 9. At step 900, a limitation-strength signal 545 is received from the limitation strength determination mechanism 535. At step 905, the required action is determined in dependence on the limitation-strength signal (other information may also be used in the determining process). When the current limiter 205 is based on a series-connection of breaker section 400, step 400 involves determining the number of breaker sections 400 that should be open. The determination typically also includes determining which breaker section(s) 400 that should be opened or closed. In step 910, a control signal 520 is then generated at the output of the limitation-determination system 515, to which the current limiter 205 is connected. When the current limiter 205 comprises semiconducting switches 405, such control signal 520 could for example comprise a combination of firing and/or blocking signals (depending on whether breaker sections 400 should be switched in or out) in a conventional manner, so that each semiconducting switch 405 that should change its state will receive a firing or blocking signal.

The determination of step 905 could for example be based on a predetermined scheme for opening/closing the breaker sections 400. Such pre-determined scheme could for example operate to open (close), when the current-limiting strength is to be increased (decreased), the semi-conductor switch 405 of the breaker section 400 that has been closed (open) the longest of the closed (open) breaker sections 400. In such embodiment, the control signal generator 540 could for example include a memory for storing information on at what moments the different breaker sections 400 were last switched in or out. Other predetermined schemes could alternatively be used.

Alternatively, in a breaker section based current limiter, the control signal generator 540 could in step 905 determine which breaker sections 400 to open or close based on an estimation of the temperature of, or the amount of energy absorbed in, the different non-linear resistors 410, so that the open breaker sections 400 will be selected from the breaker sections 400 having the lowest temperature, or, correspondingly, the highest energy-absorbing capacity. The highest temperate that is safe, or the maximum energy that can safely be absorbed by a non-linear resistor 410 during a fault-on period is typically known (the effects of cooling can typically be neglected during the fault-on period). The present energy-absorbing capacity of different non-linear resistors 410 could then for example be estimated by calculations of the absorbed energy in the non-linear resistors 410, or by means of measurements performed by a temperature sensor which would be arranged to deliver a temperature signal to the control signal generator 540. For example, the following expression could be used for the estimation of the energy absorbed in a non-linear resistor 410:

$$E_{410,i}(t) = \int_{t_{start}}^{t} I(t) \cdot U_{410,i}(I) \cdot a_i(t) dt \quad (1a),$$

where $E_{410,i}(t)$ is the energy absorbed by the $i^{th}$ non-linear resistor 410 at time t since the occurrence of the fault at time $t_{start}$; I(t) is the current through the current-limiting breaker 205, which is measured by the current measuring device 505 and known to the current limiting system 515; $U_{410,i}(I)$ is the known U-I-characteristic of a non-linear resistor 410; and $a_i(t)$ is a function which takes the value 0 when the semi-conducting switch 405 of the $i^{th}$ breaker section is closed, and the value 1 when the semi-conducting switch 405 of the $i^{th}$ breaker section 400 is open. Expression (1a) could be refined, if desired, to for example include effects of cooling. However, during a fault-on period, effects of cooling can generally be neglected, since time constants for cooling are typically much longer than the fault on period. Furthermore, an estimation of the absorbed energy $E_{410,i}(t)$ based on an assumption that the voltage $U_{410,i}$ across a non-linear resistor is constant will in most applications give an estimation of sufficient accuracy:

$$E_{410,i}(t) = \int_{t_{start}}^{t} I(t) \cdot U_{410,i} \cdot a_i(t) dt \quad (1b).$$

When expression (1) is used for determining which breaker sections 400 to open or close, the breaker section 400 to be opened when k is increased could for example be the breaker section 400 having the lowest $E_{410,i}(t)$ of the currently closed breaker sections 400, and breaker section to close when k is decreased could for example be the breaker section 400 having the highest $E_{410,i}(t)$ of the currently open breaker sections 400.

Following fault clearing, the estimate of the energy absorbed in the non-linear resistors 410 should advantageously be adjusted to reflecting cooling, so that an accurate estimate of the absorbed energy is available should another fault occur. In one implementation, this is solved by only allowing re-closing the current limiter 205 after a cooling time period has elapsed since the current limiter 205 was activated, at which time the $E_{310,i}(t)$ is re-set to the initial value.

If an indication exists that the current limiter 205 may be damaged unless the current is actually broken rather than limited, the determination of step 905 could advantageously result in a decision to open enough (typically all) breaker sections 400, in order to break the current. Such damage-indication could for example be based on an estimation of absorbed energy in the non-linear resistors 410; on temperature measurements of the non-linear resistors 410; or on the time during which the non-linear resistors 410 have been switched in during the fault-on period. The procedure to asses when to trip the current limiter 400 due to excessive absorbed energy could for example be based on the breaker section 400 having the highest absorbed energy. Assuming that breaking the current completely would require all breaker sections 400, it should be ensured that the breaker section 400 with the highest absorbed energy can be switched-in a final time. Thus, in one embodiment, the current limiter 205 is tripped when the absorbed energy of a non-linear resistor 410 reaches an energy threshold, and no non-linear resistor 410 of another breaker section 400 could be switched in to take its place if switched out. The energy threshold could be set with a margin to the energy level at which the non-linear resistor 410 will be damaged. In opening all breaker sections 410, the fault-current contribution to the fault from the healthy part of the DC grid connected on the other side of the current limiter 205 will be extinguished.

If a current limiter 205 has been tripped in order to protect the non-linear resistors from thermal damage, the control system 502 could, in one embodiment, continue to monitor the voltages $U_1$ and $U_2$ at the current limiter 205 (or, only $U_1$ or $U_2$, in case of uni-directional limiter). In this embodiment, a process such as the one shown in of FIG. 6b could be entered upon such self-protective tripping of the current limiter 205, with a minimum current of the regulation range, $I_{min}$, set to zero. This would particularly be useful if the faulty part of the DC grid is connected to another current source, for example an HVDC converter 105, the current supply of which has not been cut off. When the fault is cleared, the voltage which was depressed during the fault-on period will then start to rise, providing an indication to the current limiter 205 that the fault has been cleared.

The estimation of absorbed energy used to obtain a damage-indication could e.g. be made in accordance with expression (1a) or (1b). However, in order to ensure that the current can actually be broken in case a fault occurs when another fault has recently been cleared, cooling of the non-linear resistors 410 should advantageously be taken into account. This could for example be solved by only allow re-closing the current limiter 205 after a cooling time period has elapsed since the current limiter 205 was activated, such that a re-opening of the current limiter 205 can be performed without damaging the non-linear resistors. The time constant for cooling could, in one implementation, be in the order of an hour. Alternatively, the expression used for estimation of absorbed energy could be refined to include the effects of cooling. A self-protective control system which is arranged to generate a damage indication and, if required, a self-protective tripping signal, could for example be implemented as part of control system 502, or as part of an independent protection system 135. In an embodiment wherein the current limiter 205 is not capable of breaking the current, such damage indication could be used to trigger the tripping of an HVDC breaker 130 protecting the current limiter 205.

In order to ensure that the current limiter 205 would not be damaged in the unusual event of the current limiter not being capable of tripping when the self-protection system gives a tripping instruction, a redundant current limiter 205 could be provided, or, when the current limiter 205 is based on a series-connection of breaker sections 400, redundant breaker sections 400 could be provided in the current limiter 205. Alternatively, the HVDC connection could be short-circuited so that the current limiter 205 is bypassed, thus leaving the clearing of the fault to HVDC breakers 130 or current limiters 205 elsewhere in power system.

Figure 10:
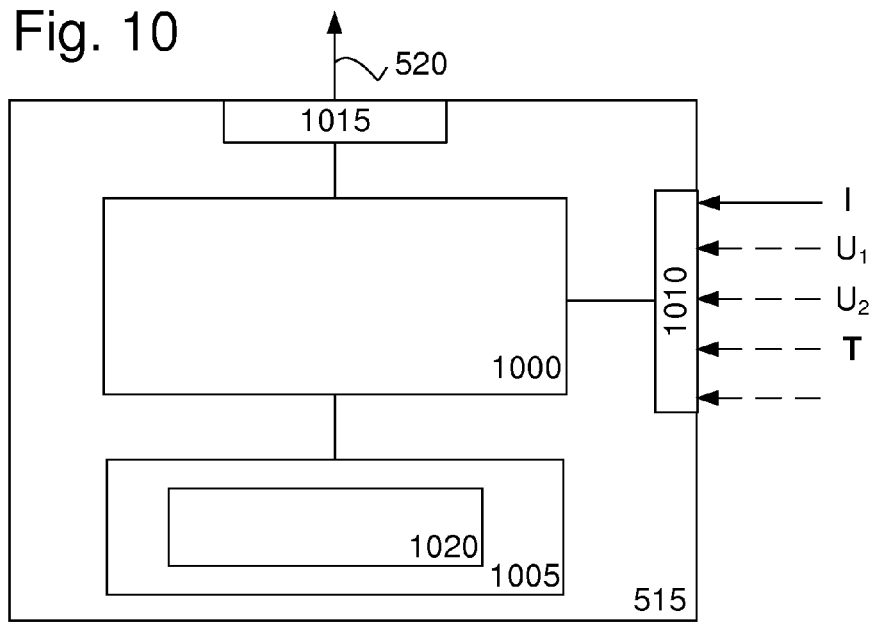
FIG. 10 schematically shows an alternative illustration of a limitation-determination system shown in FIG. 5.

In FIG. 10, an alternative way of schematically illustrating the limitation-determination system 515 of FIG. 5 is shown, wherein the limitation-determination system 515 is implemented by using a combination of hardware and software. FIG. 10 shows the limitation-determination system 515 comprising processing means 1000 connected to a computer program product 1005 in the form of a memory, as well as to interfaces 1010 and 1015. Interface 1010 is arranged to receive input signals comprising information relevant to the limitation strength determination. Such signals include signal I indicative of the present level of the current, and could e.g. also include signals U1 or U2 (or both, as appropriate) and signals indicative of the temperatures of the non-linear resistors 410, as discussed above. Interface 1015 is arranged to deliver the control signal 520.

The memory 1005 stores computer readable code means in the form of a computer program 1020, which, when executed by the processing means 1000, causes the limitation-determination system 515 to perform a current-limiting control method. Different embodiments of such method are illustrated in FIGS. 6a-b, FIG. 8 and FIG. 9. In other words, the limitation-determination system 515 would in this embodiment be implemented by means of one or more general purpose processors or one or more processors especially developed for the limitation-determination system 515, in combination with software 1020 for performing current limiting control. In FIG. 10, the software 1020 is shown to be stored on one physical memory 1005, however, software 1020 could be divided onto more than one physical memory 1005. A memory 1005 could be any type of non-volatile computer readable means, such as a hard drive, a flash memory, an EEPROM (electrically erasable programmable read-only memory) a DVD disc, a CD disc, a USB memory, etc.

Figure 11A:
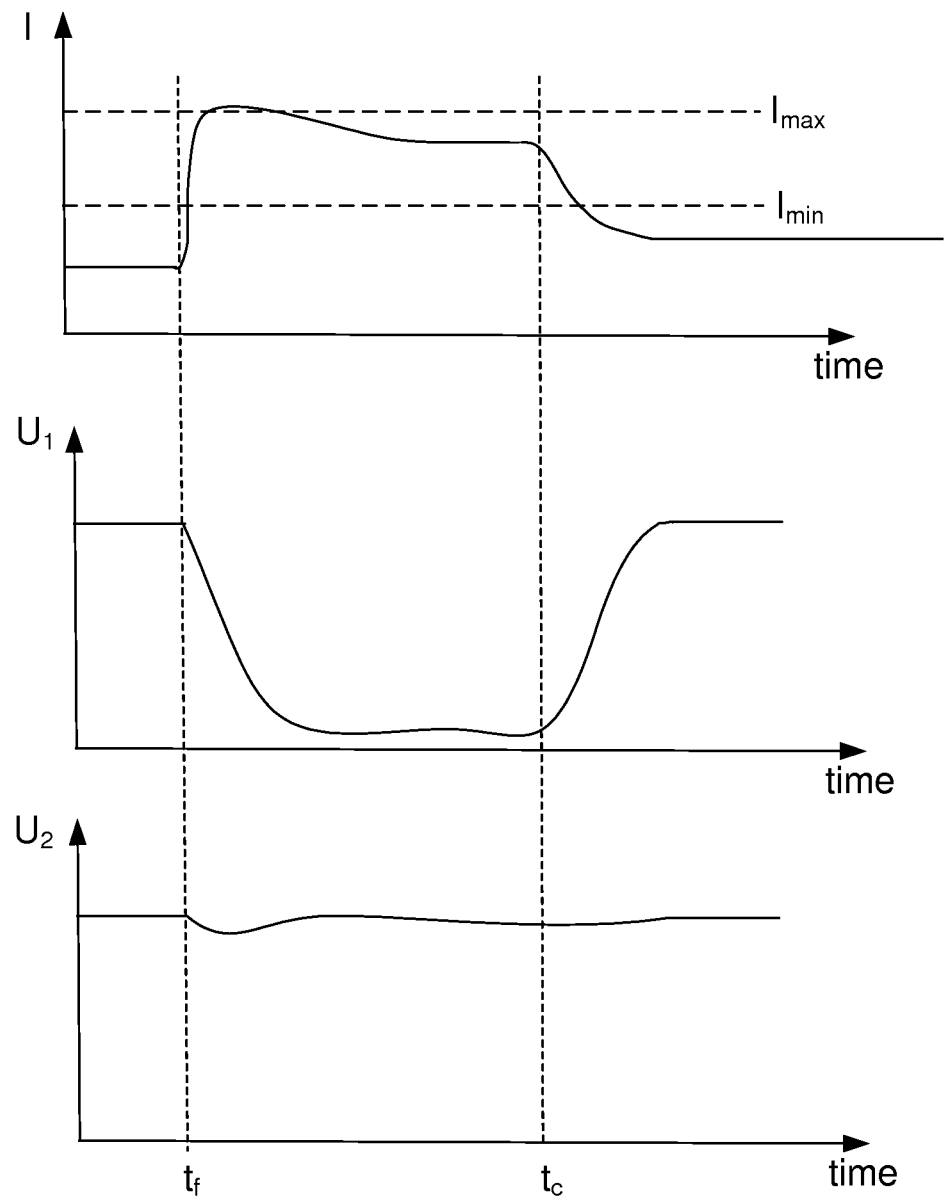
Figure 11B:
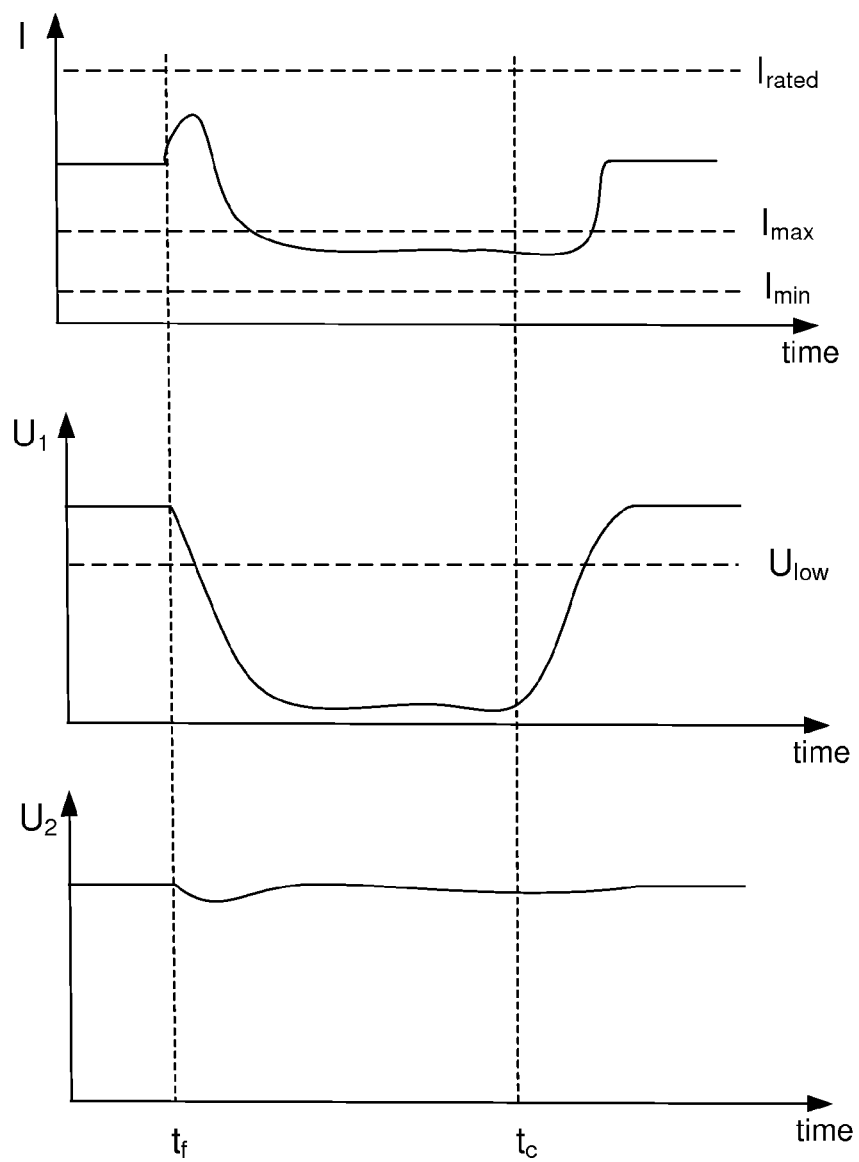
Figure 11C:
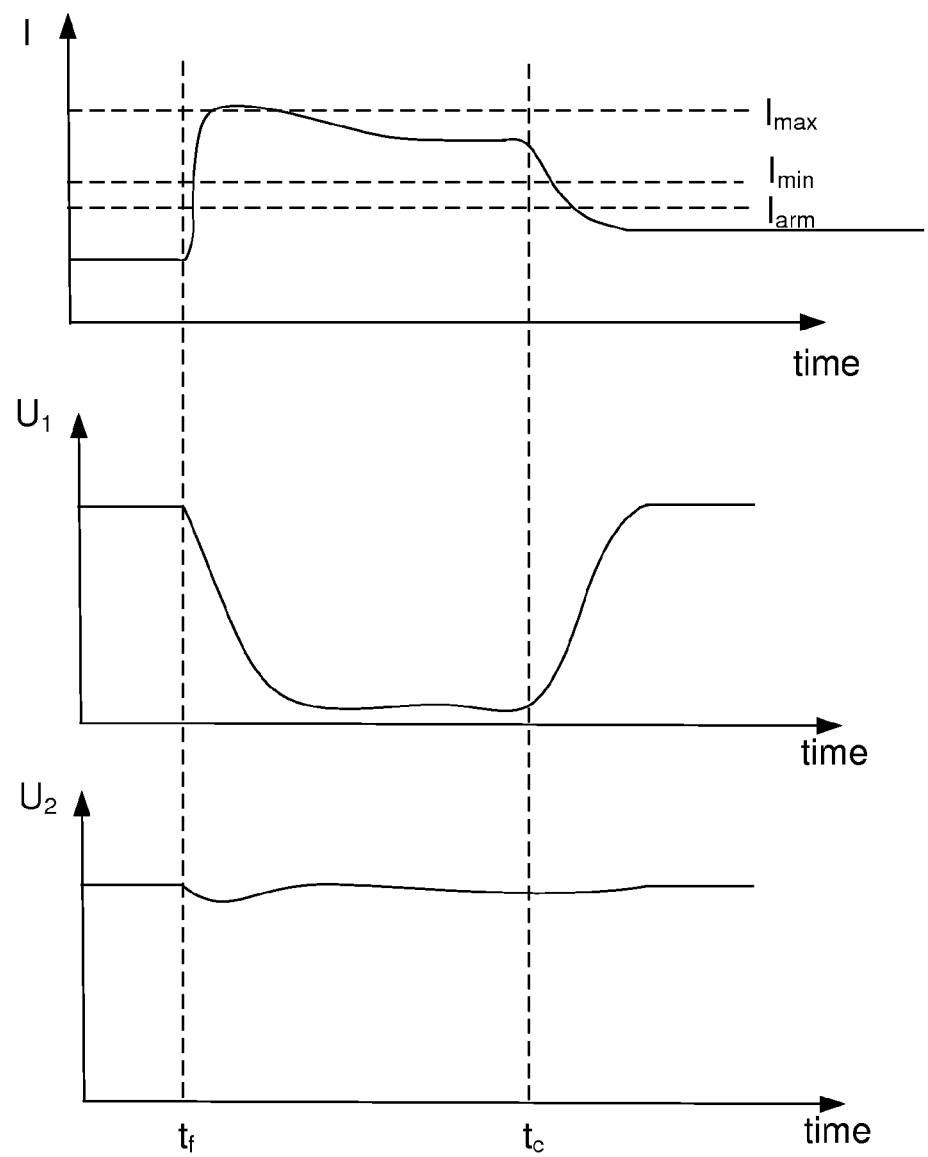

FIGS. 11a-11d illustrate the sequence of events according to some embodiments described above, in a situation where a line fault occurs in a first zone 300 at a time $t_f$, and where the fault is cleared at a time $t_c$. The current I through a current limiter 205 is plotted against time, as well as the voltage ($U_1$) at side of the current limiter 205 which is connected towards the fault, and the voltage ($U_2$) at the other side of the current limiter 205, connected to the healthy part of the DC grid 100. FIGS. 11a and 11b represent embodiments wherein the current limiter 205 does not have a transfer switch 415, while FIGS. 11c and 11d represent embodiments wherein a transfer switch 415 is present. Furthermore, FIGS. 11a and 11c represent embodiments wherein the rated current lies below the regulation range, while FIGS. 11b and 11d represent embodiments wherein the rated current lies above the regulation range. Worth noting is that the voltage in the healthy part of the DC grid, $U_2$, is essentially undisturbed, making it possible to continue organized power transfer in this part also during the fault-on period.

The application of current limiters 205 as discussed above can be applied to both mono-polar and bipolar HVDC connections. If the HVDC connection consists of two pole lines, with positive and negative pole voltage, the HVDC connection will be equipped with two current-limiters 205, while for a single pole HVDC connection, positive or negative pole voltage, with or without a metallic return, a single current limiter 205 will typically be used on the single pole connection. Other configurations can alternatively be used.

The above description has been made in terms a high voltage DC grid. However, the invention is equally applicable to DC grids comprising AC/DC converters of any voltage level, including Medium Voltage Direct Current (MVDC) grids comprising MVDC converters, MVDC connections and MVDC breakers.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. A current-limitation system for limiting a current through a DC connection in case of a fault occurring in a DC grid of which the DC connection forms a part, the current-limitation system comprising a current limiter for series-connection into the DC connection, and a control system for controlling the current-limiting strength of the current limiter; wherein the current limiter comprises a series connection of independently controllable breaker sections, wherein a breaker section comprises a parallel connection of a non-linear resistor and a semi-conductor switch of turn-off type;

the control system comprises a current measuring device; and the control system is operable to:

detect a fault; and, in response to detecting the fault, adjust the current-limiting strength of the current limiter, the current-limitation system being wherein the control system further comprises a voltage measuring device arranged to measure the voltage at at least one side of the current limiter;

the control system is operable to detect a fault by checking whether the voltage at at least one side of the current limiter has fallen below a first voltage threshold;

the current measuring device is arranged to measure the current through the current limiter; and the control system is operable to adjust, in response to detection of a fault, the current-limiting strength of a current limiter in a manner so that if the current through the current limiter exceeds a first current threshold ($I_{max}$), the current-limiting strength is increased; and if the current through the current limiter falls below a second current threshold level ($I_{min}$), the current-limiting strength is decreased, wherein the first current threshold lies below the rated current of the transmission.

2. The current-limitation system of claim 1, wherein the control system is further operable to:
estimate the present energy absorbing capacity of the non-linear resistors; and
select which breaker section(s) should be opened or closed, if any, in dependence of the different present energy absorbing capacities of the non-linear resistors.

3. The current-limitation system of claim 2, wherein
the current limiter further comprises a transfer switch connected in parallel with the series-connection of breaker sections, and
the control system is further operable to
open the transfer switch, thus commutating the current to the series connection of breaker sections, if:
the current through the current limiter exceeds a third current threshold ($I_{arm}$), wherein the third current threshold is above the expected current level during normal operation, or
the voltage at an end of the current limiter falls below a second voltage threshold, wherein the second voltage threshold is below the expected voltage level during normal operation.

4. The current-limitation system of claim 1, wherein
the current limiter is a current limiting breaker capable of breaking the current at at least the rated voltage.

5. The current-limitation system of claim 1, further comprising
a self-protective control system operable to generate a damage indication if the current limiter is at risk for thermal damage, and to generate, in response to such damage indication, a tripping signal instructing the current limiter, or a breaker protecting the current limiter, to break the current.

6. An AC/DC converter station comprising an AC/DC converter and a connection to a DC grid, wherein the AC/DC converter station further comprises a current-limitation system according to claim 1, wherein the current limiter of the current-limitation system is series-connected in the connection to the DC grid.

7. A DC grid comprising at least two AC/DC converters interconnected via a DC connection, the DC grid further comprising:
at least one current-limitation system according to claim 1, where the current limiter of the current-limitation system is series-connected in a DC connection.

8. The DC grid of claim 7, wherein the DC grid comprises a plurality of AC/DC converters interconnected via DC lines, and wherein
the DC grid is divided into at least two zones by means of at least one current limiting system in a manner so that a current limiter is connected in each of the DC line(s) by which two zones are interconnected.

9. A method of operating a current-limitation system for limiting a current through a DC connection in case of a fault occurring in a DC grid of which the DC connection forms a part, the current-limitation system comprising a current limiter and a control system, wherein the current limiter comprises a number of individually controllable, series connected breaker sections, each comprising a parallel connection of a non-linear resistor and a semi-conductor switch of turn-off type; the method comprising:
detecting, in the current-limitation system, a fault; and, in response to detecting the fault,
adjusting the current-limiting strength of the current limiter; the method being wherein:
the detecting of the fault is performed by checking whether the voltage at at least one side of the current limiter has fallen below a first voltage threshold; and
the adjusting of the current-limiting strength of the current limiter is performed in a manner so that
if the current through the current limiter exceeds a first current threshold ($I_{max}$), the current-limiting strength is increased; and
if the current through the current limiter falls below a second current threshold level ($I_{min}$), the current-limiting strength is decreased, wherein
the first current threshold lies below the rated current of the transmission.

10. The method of claim 9, further comprising
estimating the present energy-absorbing capacity of the non-linear resistors; and
selecting which breaker section(s) should be open or closed, if any, in dependence of the different energy absorbing capacities of the non-linear resistors.

11. The method of claim 9, wherein
the current limiter comprises a transfer switch connected in parallel with a main switch;
said step of adjusting the current-limiting strength is conditional on the transfer switch being open; and
the method further comprises:
opening the transfer switch, thus commutating the current to the main switch, if:
the current through the current limiter exceeds a third current threshold ($I_{arm}$), wherein the third current threshold is above the expected current level during normal operation, or
the voltage at a side of the current limiter goes below a second voltage threshold, wherein the second voltage threshold is below the expected voltage level during normal operation.

12. The method of claim 9, further comprising
generating a damage indication in dependence of estimations of the present energy-absorbing capacity of the current limiter indicating that the current limiter is at thermal risk; and
tripping the current limiter to break the current in response to said damage indication.

13. A computer program for operating a limitation-determination system for controlling the current-limiting strength of a current limiter which is series-connected in a DC connection in order to limit the effects of a fault in a DC grid of which the DC connection forms a part, the current limiter comprising a series connection of independently controllable breaker sections, wherein a breaker section comprises a parallel connection of a non-linear resistor and a semi-conductor switch of turn-off type, the computer program comprising:
computer program code portions which, when run on a processor of the a limitation-determination system, causes the limitation-determination system to:
receive measurements of a current through the current limiter;
receive measurements of the voltage at at least one side of the current limiter;
check whether a fault in the DC grid can be detected using said voltage measurements; and, in response to detection of a fault:
adjust the current-limiting strength of the current limiter in a manner so that if the current through the current limiter exceeds a first current threshold ($I_{max}$), the current-limiting strength is increased; and if the current through the current limiter falls below a second current threshold ($I_{min}$), the current-limiting strength is decreased, wherein the first current threshold lies below the rated current of the transmission.

14. A DC grid comprising a plurality of AC/DC converters interconnected via DC lines, wherein:
the DC grid is divided into at least two zones by means of at least one current-limitation system comprising a current limiter and a control system for controlling the current-limiting strength of the current limiter, the DC grid being divided in a manner so that a current limiter is series connected in each of the DC line(s) by which two zones are interconnected;
a current limiter of a current-limitation system comprises a series connection of independently controllable breaker sections, wherein a breaker section comprises a parallel connection of a non-linear resistor and a semi-conductor switch of turn-off type;
the control system of a current-limitation system comprises a measuring device arranged to measure the current through the current limiter;
said control system is operable to:
detect a fault; and, in response to detecting the fault:
adjust the current-limiting strength of the current limiter in a manner so that
if the current through the breaker exceeds a first current threshold ($I_{max}$), the current-limiting strength is increased; and
if the current through the breaker falls below a second current threshold level ($I_{min}$), the current-limiting strength is decreased.

15. The current-limitation system of claim 2, wherein the current limiter is a current limiting breaker capable of breaking the current at at least the rated voltage.

16. The current-limitation system of claim 3, wherein the current limiter is a current limiting breaker capable of breaking the current at at least the rated voltage.

17. The current-limitation system of claim 2, further comprising
a self-protective control system operable to generate a damage indication if the current limiter is at risk for thermal damage, and to generate, in response to such damage indication, a tripping signal instructing the current limiter, or a breaker protecting the current limiter, to break the current.

18. The current-limitation system of claim 3, further comprising
a self-protective control system operable to generate a damage indication if the current limiter is at risk for thermal damage, and to generate, in response to such damage indication, a tripping signal instructing the current limiter, or a breaker protecting the current limiter, to break the current.

19. The current-limitation system of claim 4, further comprising
a self-protective control system operable to generate a damage indication if the current limiter is at risk for thermal damage, and to generate, in response to such damage indication, a tripping signal instructing the current limiter, or a breaker protecting the current limiter, to break the current.

20. An AC/DC converter station comprising an AC/DC converter and a connection to a DC grid, wherein the AC/DC converter station further comprises a current-limitation system according to claim 2, wherein the current limiter of the current-limitation system is series-connected in the connection to the DC grid.

* * * * *